March 14, 1950  H. E. WARREN  2,500,478
SPEED GOVERNOR
Filed April 15, 1943  9 Sheets-Sheet 1

INVENTOR
Henry E. Warren
BY
Geo. K. Woodworth
ATTORNEY

March 14, 1950  H. E. WARREN  2,500,478
SPEED GOVERNOR
Filed April 15, 1943  9 Sheets-Sheet 3

INVENTOR
Henry E. Warren
BY
Geo. H. Woodworth
ATTORNEY

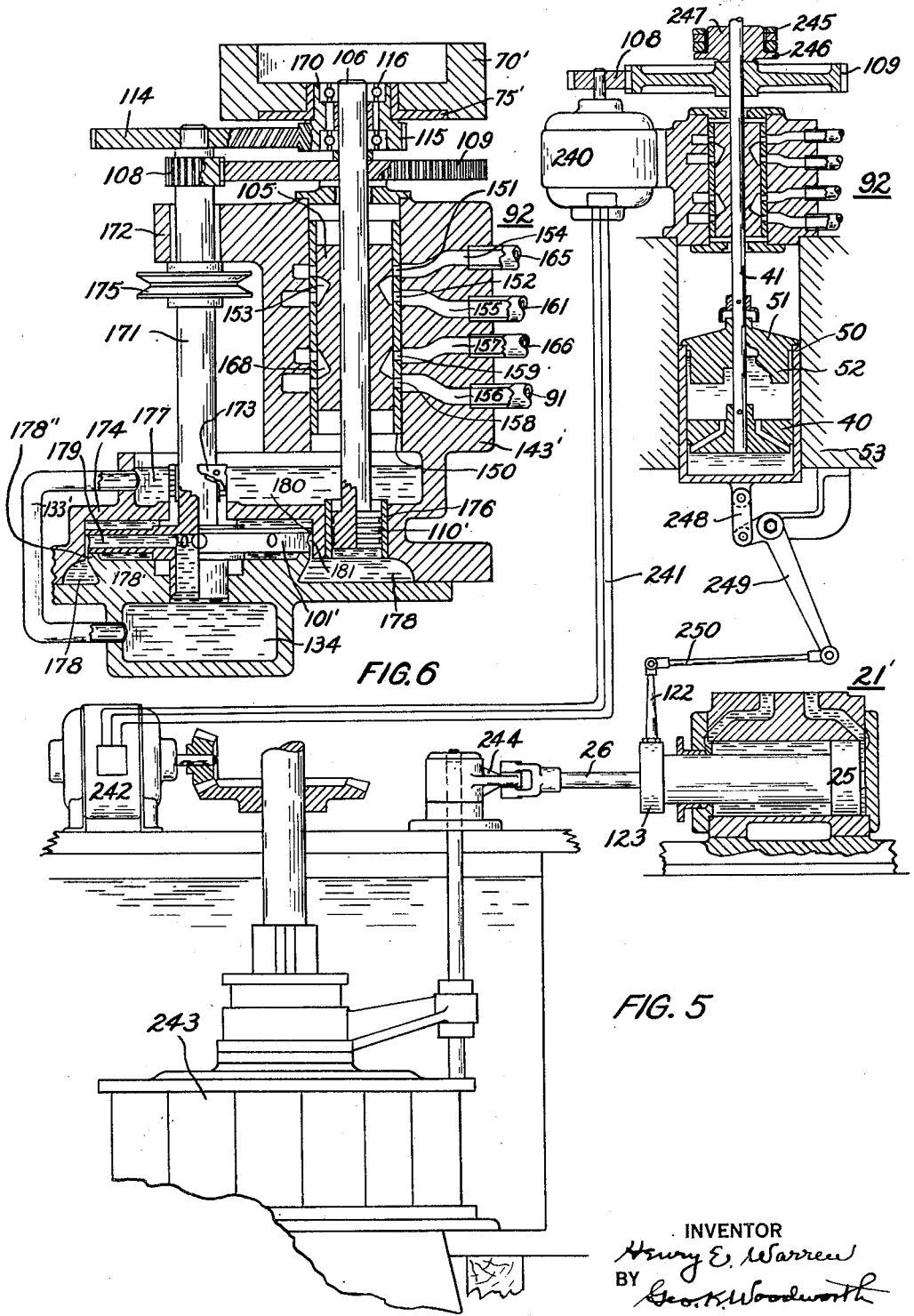

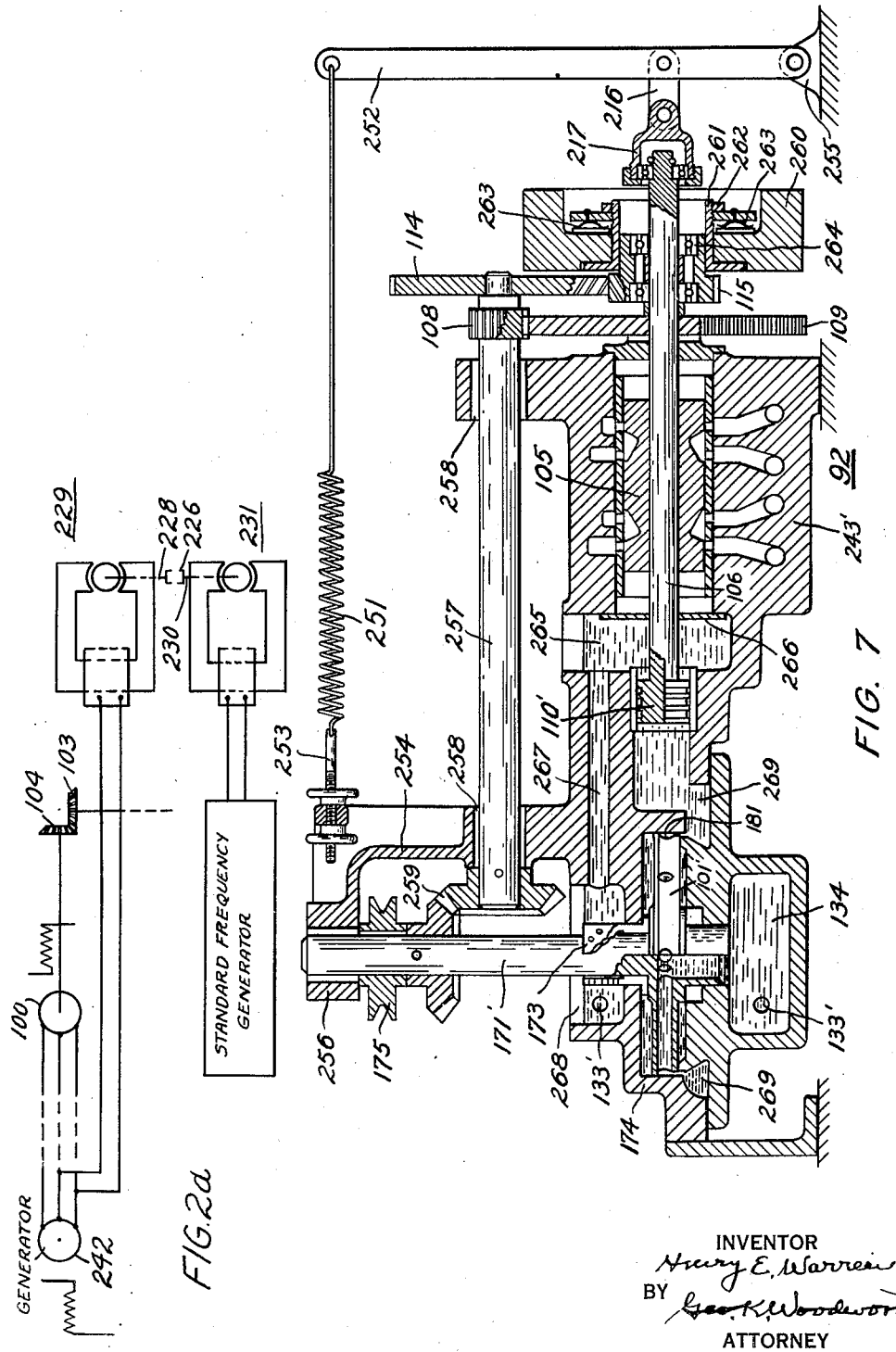

March 14, 1950     H. E. WARREN     2,500,478
SPEED GOVERNOR

Filed April 15, 1943     9 Sheets-Sheet 7

INVENTOR
Henry E. Warren
BY Geo. K. Woodworth
ATTORNEY

March 14, 1950  H. E. WARREN  2,500,478
SPEED GOVERNOR

Filed April 15, 1943  9 Sheets-Sheet 8

INVENTOR
Henry E. Warren
BY Geo. K. Woodworth
ATTORNEY

Patented Mar. 14, 1950

2,500,478

UNITED STATES PATENT OFFICE 2,500,478

SPEED GOVERNOR

Henry E. Warren, Ashland, Mass.

Application April 15, 1943, Serial No. 483,162

15 Claims. (Cl. 264—19)

This invention relates to speed governors and more especially to governors for regulating the speed of turbines, and the like, which are controlled by hydraulically actuated servomotors.

Heretofore, the axial movement of the valve interposed between a source of fluid under pressure and the servomotor for controlling the supply of fluid to the latter, was effected by ball or weight governors, or like centrifugal devices, which varied the position of the valve in accordance with the changes in the speed of the prime mover to be governed, and means actuated by said servomotor were employed to react upon the valve during its return to neutral position in order to prevent the creation of oscillatory movement thereof, commonly known as "racing" or "hunting."

One of the objects of the present invention is to provide a substitute for said ball governors and other centrifugally actuated weighted devices that may be used in existing equipment for varying the axial position of the valve aforesaid, whereby such equipment may be greatly simplified and improved.

With this object in view, my invention comprises centrifugal means, such as a speed measuring impeller connected for rotation by the prime mover the speed of which is to be governed, which by co-operating with a fluid contained in the casing in which it is disposed, creates hydraulic pressure tending to move the valve axially.

Such impeller, which may be of any suitable construction, may be connected directly with the valve for simultaneous axial and rotary movement therewith, or, preferably, is disposed separately from the valve and the pressure created thereby communicated to said valve for imparting axial movement thereto. In both cases the valve, preferably, is rotatable to avoid undue friction and insure freedom of axial movement. The valve and its connected parts are acted upon by a definite force tending to move the same axially in a given direction, and this force is balanced when the valve is in its neutral position by the hydraulic pressure created by the impeller. Preferably, the governor is mounted vertically so that such definite force is the force of gravity. However, the governor may be mounted horizontally, and any suitable means, such, for example, as a spring, may be used to create the definite force aforesaid.

The valve preferably is balanced, and another object of the invention is the provision of a novel balanced valve having one or more pairs of ports. If one pair only is used, one member thereof is constructed to be a reaction port tending to produce an opening force upon the valve element, and the other, called a free port, a closing force upon said element which substantially neutralizes such opening force. Preferably, a plurality of such pairs are used and are disposed in spaced relation around the periphery of the valve sleeve. In either case, the reaction and free ports are connected with an intake port by an annular groove in the valve element upon the outward movement of said element.

Another important object of the invention is the employment of the combination of the acceleration of an inertia element produced by a change in speed of the prime mover and the actual change in speed thereof for moving the valve axially to produce the desired correction in the power output of the prime mover and restore the speed thereof to its normal value. For this purpose, a fly wheel is suitably disposed to rotate around the shaft on which the valve is mounted for axial and rotary movement, said fly wheel being geared to the prime mover or to a synchonous motor driven by the latter, by spiral or helical gearing whereby an upward or downward thrust will be imposed upon the driven gear when the speed of the inertia element is accelerated or retarded and the axial movement of the valve varied accordingly. The actual change in speed of the impeller will, of course, vary the axial movement of the valve and the combination of the acceleration effect, which is a maximum at the beginning of a change of speed, with the variation in pressure effected by the impeller will alter the position of the valve much more rapidly than if the impeller alone were used.

It will be understood, of course, that the impeller-inertia-element combination may be employed in existing systems wherein overtravel of the valve upon its return to its neutral position is prevented by connections between the servomotor and the valve; but a very important object of the present invention consists in the use of the inertia element to return the valve to its neutral position at substantially the same instant at which the speed of the prime mover is restored to its normal value without the use of anti-racing connections; in other words, to eliminate hunting and make the governor a dead-beat device without the use of such connections.

Another object of the invention is the employment of novel means actuated by the servomotor to eliminate hunting, such means comprising suitable connections whereby the casing in which the impeller rotates is moved axially and relatively to said impeller to vary the effect on the valve of the hydraulic pressure developed by the servomotor.

An additional object is to effect the same result by said connections arranged to actuate a piston or Sylphon bellows disposed in a cylinder beneath the piston mounted on the end of the valve in such manner as to displace the liquid beneath said piston.

A further object of the invention is to provide a governor in which the servomotor and the centrifugal impeller (which of course rotates at a speed proportional to that of the prime mover the speed of which is to be regulated and is therefore a speed measuring element) are located adjacent to said prime mover, for example, a turbine, and the impeller rotated directly from the shaft of the prime mover and independently of the generator driven thereby, while the valve and the other parts of the governor are located remotely from the turbine, in which case, the hydraulic pressure developed by the impeller is conveyed by piping to the piston mounted on the valve rod.

In existing systems, biases in the form of springs, turnbuckles which change the length of connections, and other means, are provided for the valve to obtain any desired amount of speed droop and for other purposes, and while such spring biasing means are applicable to my improved governor, it is another object of my invention to substitute therefor a system of oil level biasing employing bimetallic bellows, pistons, or the like, disposed in an oil receptacle whereby the biasing heretofore effected by the means above specified is produced in an improved manner.

A further object of the invention is to provide means whereby exact agreement of average frequency between the generator driven by the prime mover the speed of which is to be governed and a time standard or any other source of periodic function of time is effected by two synchronous motors, one energized by current of standard frequency, and the other, by the current of a generator driven by the prime mover the speed of which is to be governed, together with means actuated by said synchronous motors jointly, whereby the biasing of the valve will be such that the average frequency of the generator driven by the prime mover will be maintained equal to that of the standard. A single synchronous motor having its stator and rotor energized, respectively, by the prime mover driven generator and a standard frequency source of current, may be used for this purpose. These refinements are highly desirable for power systems to which electric clocks are connected.

Another object of the invention is to provide a centrifugal impeller in which the head or hydraulic pressure produced is due substantially to the tangential speed component of the liquid which the impeller moves or tends to move toward the piston on the end of the valve shaft, so that for any given impeller speed, the pressure of the oil on said piston is always the same.

A further object is the provision of a governor having an extremely simple and effective adjustable mechanical device to produce definite maximum gate limits.

Another object is to provide a governor which may be easily adapted to different conditions by varying the weights of the fly wheel and other elements making up the inertia system, such as the valve, the piston thereto attached, and the gear whereby the piston rod is coupled to a gear the speed of which is proportional to that of the prime mover to be governed, and also by varying the impeller and piston areas, the impeller speed and the angle of inclination of the teeth of the helical gears.

An additional object is to provide a governor that may readily be adapted to remote speed control by electrically actuated means.

Other objects of the invention, together with the means by which they are realized in practice, will hereinafter appear.

In the drawings accompanying and forming a part of this specification,

Figure 2a is a diagram showing the circuit connections of the motors 229, 231, of Fig. 2.

Fig. 3a is a central vertical section on an enlarged scale of my improved balanced valve, showing schematically the relation of the upper ports of the valve when the speed of the prime mover has increased, and Figure 3b is a similar section showing, the relation of the lower ports of the valve when the prime mover speed has decreased.

Fig. 5 is a fragmentary central vertical section partly in elevation and partly diagrammatic representing the application of my impeller-valve combination to existing systems as a substitute for a centrifugal ball governor.

Fig. 6 is a fragmentary central vertical section showing the application of my impeller-valve-inertia-element combination to existing systems for the purpose of eliminating the anti-racing connection between the governor and servomotor.

Fig. 7 is a fragmentary central vertical section of a modification in which the governor is placed in a horizontal position and a spring is employed to create a definite force on the valve opposing the force imposed thereon by the hydraulic pressure developed by the impeller.

Figure 1:
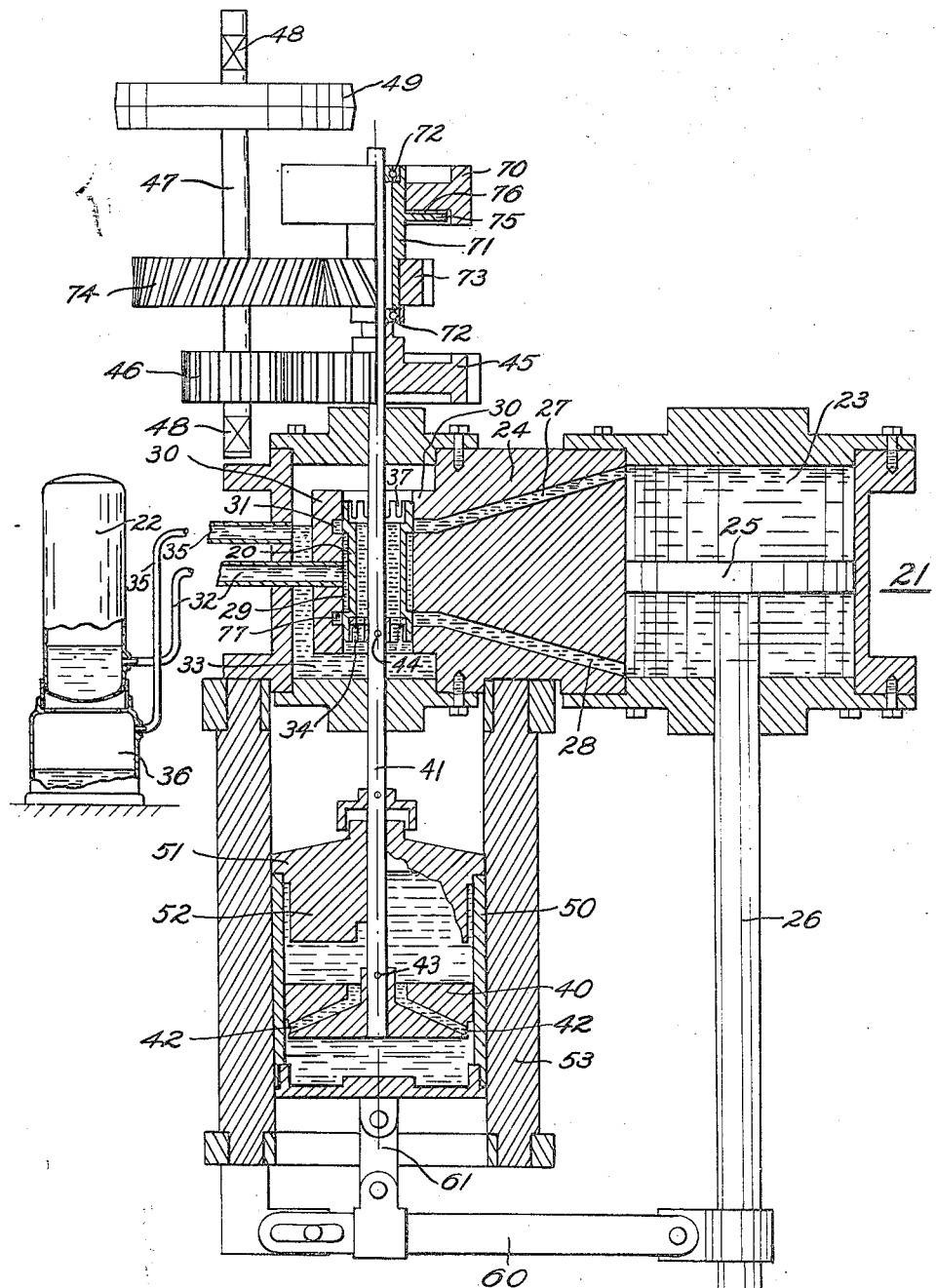
Figure 1 is a central vertical section, partly in elevation, of a simple form of my speed governor in which the impeller is directly connected to the valve.

Referring to the drawings selected to more fully disclose the principle underlying my invention, Figure 1 illustrates a simple form of the invention which is serviceable where the highest degree of precision and regulation is not required. In this figure, a valve 20 mounted for axial and rotary movement is interposed between a source 22 of fluid under pressure and a servomotor 21 for controlling the supply of fluid thereto. The servomotor comprises a cylinder 23 which, in the present instance, is formed at one end of the casting 24, the piston 25 and piston rod 26, the free end of which is connected by means not shown in Fig. 1 but indicated in Fig. 5, for controlling the valve or gate mechanism of the prime mover the speed of which is to be governed, such, for example, as an engine or turbine, the arrangement being such that the downward or outward movement of the piston will reduce the power output and hence the speed of the prime mover.

The block or casting 24 is provided with ducts 27, 28, connecting the interior of said cylinder with the annular space 29 between the exterior surface of the valve and the portion 30 of said casting surrounding the same, said space being formed by reducing the external diameter of the valve intermediate the ends thereof. When the valve is in neutral or normal position, that is, when the speed of the prime mover is normal, the valve will be closed, that is to say, there will be no communication between the source of fluid pressure and the servomotor, as shown in Fig. 1.

However, when the speed becomes abnormal, the valve will move upwardly or downwardly, as the case may be, and fluid under pressure from the tank 22 will enter the cylinder 23 and drive the piston downwardly (outwardly) or upwardly (inwardly), accordingly. Thus, if the speed of the prime mover increases due to reduction of its load, the valve will move upwardly, thereby bringing the annular space 29 into communication with the annular groove 31, formed in the interior face of the casting and as the duct 27 will then be in communication with said space, fluid pressure will pass from the pressure tank by way of the pipe 32 which connects the tank with said space and into the cylinder by way of the duct 27, inwardly of the piston 25 and drive the same outwardly. At the same time the duct 28 is brought into communication with the space 33, via the serrations 34 in the lowermost head of the valve and thence with the exhaust pipe 35 which enters said space, and the fluid in the cylinder below the piston will be exhausted through the duct 28, space 33 and pipe 35 into the sump 36.

When, however, the speed of the prime mover is reduced on account of an increase in its load, the valve 20 will move downwardly, the space 29 between the ends of the valve will be brought into register with the duct 28, fluid pressure will then pass through said duct into the cylinder 23 below the piston 25 and drive the same upwardly while the fluid above said piston will exhaust through the duct 27, the serrations 37 in the upper end of the valve, the space 33, and thence through the pipe 35 into the sump.

Heretofore, the axial movement of the valve was effected directly by centrifugally actuated weights, such as balls or the like. By means of the present invention, however, the need for such devices is eliminated and the axial movement imparted to the valve is effected by liquid pressure through centrifugal means, such as an impeller mounted for axial and rotary movement with said valve, such centrifugal means co-operating with a liquid for creating on one side thereof hydraulic pressure tending to move both the valve and centrifugal means axially.

In the simple form of my invention illustrated in Fig. 1, the centrifugal means comprises an impeller of any suitable construction, such impeller being shown in the present instance as a piston 40 suitably secured to the valve rod 41 for rotation therewith and provided with a plurality of ports, two of which are shown at 42, each port leading from the upper face or intake side of the piston near the center thereof to its periphery near its lower face. In the present instance, the impeller is secured to the valve rod 41 by the pin 43 and the valve is secured thereto by the pin 44, both of these elements being somewhat loosely coupled to the valve rod in order to eliminate the necessity for exact centering.

The impeller must of course be connected for rotation by the prime mover the speed of which is to be governed, and, in the present instance, such connection is made by the speed reducing gears 45, 46, the gear 45 being secured to the valve rod and the gear 46 to the countershaft 47, journalled in the bearings 48, 48, and rotated by the prime mover through a belt, not shown, and the pulley 49 attached to said countershaft.

The impeller is disposed within a cylindrical casing or reservoir 50 containing a liquid and the casing is provided with a closure 51, provided with vanes 52 depending into said liquid to check the rotary movement thereof created by the rotation of the impeller. The impeller takes in the liquid, which may be oil, from the upper portion of said casing and discharges it into the bottom portion thereof, thereby developing hydraulic pressure, the magnitude of which is a function of the impeller's velocity of revolution; and this pressure acting on the lower face of the impeller tends to impart upward axial motion thereto and to all the elements thereto attached.

When the speed of the prime mover is normal, the hydraulic pressure developed by the impeller and acting against the lower face thereof, thus tending to move the same upwardly, is balanced by the weight of the valve rod and all elements attached thereto. The cylindrical casing 50 is movable axially within the guide 53 secured by any suitable means to the lower face of the block 24.

By means of the lever 60 and link 61, the impeller casing is attached for axial movement to the piston rod 26 for the purpose of checking overtravel of the piston 25 in either direction. Connections, usually including dash pots, springs, and the like, between the servomotor and its control valve, which are old and well known and commonly called "anti-racing" connections, are cumbersome and not entirely satisfactory. In my improved governor, however, the ported piston 40 serves the purpose of the dash pot of the prior art, as hereinafter more fully explained.

The apparatus above described forms a simple and effective speed governor, and may be used in existing equipment without further additions thereto, the impeller replacing the ball or weighted governors heretofore used for imparting axial movement to the valve 20. It will be noted that in Figures 1 and 5, the impeller is freely mounted and is supported solely by the liquid with which said impeller co-operates for creating hydraulic force on one side thereof when in steady-state operation and the force due to said liquid in steady-state operation is opposed by a constant force equal thereto, with the result that there is no distance limitation in the movement of the impeller and the valve mechanically connected thereto, so that the impeller and valve will continuously rise or fall as long as there is a speed differential, i. e., a difference between the normal speed and the actual speed, the latter during periods in which a correction for overspeed or underspeed is made being, of course, higher or lower than the normal or set speed. In this way, my speed measuring impeller is sharply differentiated from a ball governor or other centrifugally weighted device which, during operation, moves in opposition to resilient restoring means, the effect of which on the valve movement varies with the position of the valve and therefore with the rotational speed of such governor.

One of the advantages of the impeller and attached valve herein described is that there will be an increase in the quantity of oil discharged into the servomotor cylinder in a given time, other things being equal, and the acceleration force acting on the valve will be directly proportional to the acceleration. In other words, the axial movement of the impeller and its attached valve will be a maximum for a minimum variation of hydraulic pressure. This is not true of the governors now in use wherein a small speed differential must last much longer than in the case of my improved governor in order to produce the same effect on the gate controlling the flow to the prime mover, other things being equal, and this is also true of the action of acceleration on the movement of the prior art servomotor control valves.

The piston 40 with its ports 42 performs the functions of a dash pot when a correction for overspeed or underspeed is being made by the axial movement of the casing 50. By this means, I eliminate the separate dash pot or equivalent device heretofore found necessary in all isochronous governors to be interposed between the anti-racing connection and the valve, together with the elaborate devices necessary to place such dash pots in operative relation to the valve.

To the governor above described, I prefer to add the following elements, viz., a small flywheel 70 mounted on the sleeve 71, which is arranged to rotate around the valve rod 41, ball bearings 72, 72, being, preferably, interposed between said sleeve and rod, and a helical gear 73 which is rigidly connected to said sleeve and meshes with a larger helical gear 74 rigidly attached to the countershaft 47. The flywheel, preferably, is frictionally engaged with the sleeve by mounting it on the disc 75 which may be integral with said sleeve, a sheet of fabric material 76, preferably, being interposed between said flywheel and disc. It will be clear, of course, that the inertia element, comprising the flywheel and the helical gearing means, is coupled to the valve rod by means which are tangentially frictionless and axially fixed or positive. The inclination of the teeth of the helical or spiral gears to their axes is such that when the prime mover is accelerated, rotation in its normal direction being assumed, the action of the driving helical gear 74 upon the driven helical gear 73 will impart an upward axial movement to the latter, which will augment the axial movement imparted to the valve by the hydraulic pressure developed on the lower face of the impeller. As the impeller and attached valve are freely mounted and supported, when in steady-state operation solely by the liquid with which the former co-operates for creating hydraulic force on one side thereof, and both impeller and valve are actuated by such force, and the force due to said liquid, in steady-state operation, is opposed by a constant force equal thereto, the acceleration forces acting on the valve will be directly proportional to the acceleration which, of course, is not the case where the axial movement of the valve is controlled by a ball governor or the like.

While the apparatus shown in Fig. 1 and above described, including the anti-racing connection, may be used effectively, I have discovered that the combination of the impeller with the acceleration measuring inertia element comprising the helical gearing and the flywheel, may be employed to return the valve to its neutral position practically simultaneously with the restoration of the speed of the prime mover to normal without the anti-racing connections shown in Fig. 1, as hereinafter more fully explained.

It will be obvious that in existing systems in which centrifugally actuated weighted devices are employed with anti-racing connections, the helical gear and fly wheel arrangement shown in Fig. 1 may with advantage be used.

The operation of the governor hereinbefore described is as follows:

The countershaft 47 is belted to or otherwise connected for rotation by the prime mover at a speed which is proportional to that of the latter and the valve will be rotated at a lower but proportional speed by the speed reducing spur gears 45, 46, the rotation of the valve being for the sole purpose of reducing friction between the valve and its sleeve and thereby preventing undue resistance to axial movement. The speed at which the valve rotates is immaterial, but it is of course absolutely essential that the rotational speed of the impeller be proportional to that of the prime mover and that whether connected to rotate with the valve or separately therefrom, it must be a speed measuring element. If the speed of the prime mover is increased, there will be imparted to the valve rod a definite upward thrust due to the action of the helical gears and the inertia of the fly wheel, and when such speed reaches a certain value, the hydraulic pressure developed beneath the impeller piston added to the upward force produced by the spiral gear combination, will lift the revolving valve stem, with its entire load, and thus move the valve upwardly, thereby supplying oil under pressure to the servomotor, with the result that the piston rod 26 will move downwardly, thereby checking the power output or speed of the prime mover. At the same time, the impeller casing 50 will also move downwardly to a small extent, thus tending to restore the valve to its neutral position and consequently check the overtravel downwardly of said piston.

If the speed of the prime mover still continues too high, the servomotor piston will move downwardly until there is a balance between the power output and the load of the prime mover at the correct speed. After that, all the parts will be in equilibrium, but whenever a further load change occurs and the speed of the prime mover rises or falls, there will be a corresponding acceleration or retardation, which will be felt by the inertia element comprising the helical gears and the flywheel. This will be followed by an effect due to the change in speed and the resulting change in the pressure beneath the impeller. The combination of these two actions, that is, acceleration and the actual change in speed, will very promptly alter the position of the servomotor piston so as to produce the proper correction in the power output of the prime mover and restore the speed to its normal value.

As indicated in Fig. 1, the oil or other fluid employed to actuate the servomotor at all times completely fills the spaces in the cylinder 23 above and below the piston 25, the ducts 27 and 28, the space 29 between the valve and its sleeve, the pipe 32 throughout its entire length (the tanks 22 and 36 and their connections 32, 35, being indicated schematically, merely, in Fig. 1) and the space 33 surrounding the valve housing up to the level of the exhaust pipe 35. From the foregoing description, it will be readily understood by those skilled in the art that upon retardation of the speed of the prime mover due to increase in load, the valve will be moved downwardly due to both the reduction in the hydraulic pressure developed by the impeller and the downward thrust due to the action of the helical gears and the inertia of the flywheel, thereby connecting the source of fluid pressure to the duct 28 via the annular groove 77, whereupon the servomotor piston will move upwardly or inwardly, and the oil above said piston will be exhausted into the sump tank 36 by way of the duct 27 and the pipe 35.

The flywheel, preferably, is mounted frictionally on the sleeve 71, as above pointed out, in order to provide the necessary slippage, when by sudden acceleration or retardation the force developed by the rapidly revolving flywheel might otherwise be excessive; but this in no way detracts from the efficiency of the governor for ordinary rates of acceleration or retardation. In this and in all other embodiments of my invention in which an inertia element is used, the effect of such element may readily be altered by varying the size and weight of the flywheel which is an easily replaceable element.

Furthermore, in order to meet differing conditions, the weights of the flywheel and all other elements making up the inertia system, the valve, the impeller and the gearing, may readily be varied, as well as the gearing ratios, the impeller and piston areas, and the angle of inclination of the teeth of the helical gears.

Figure 2:
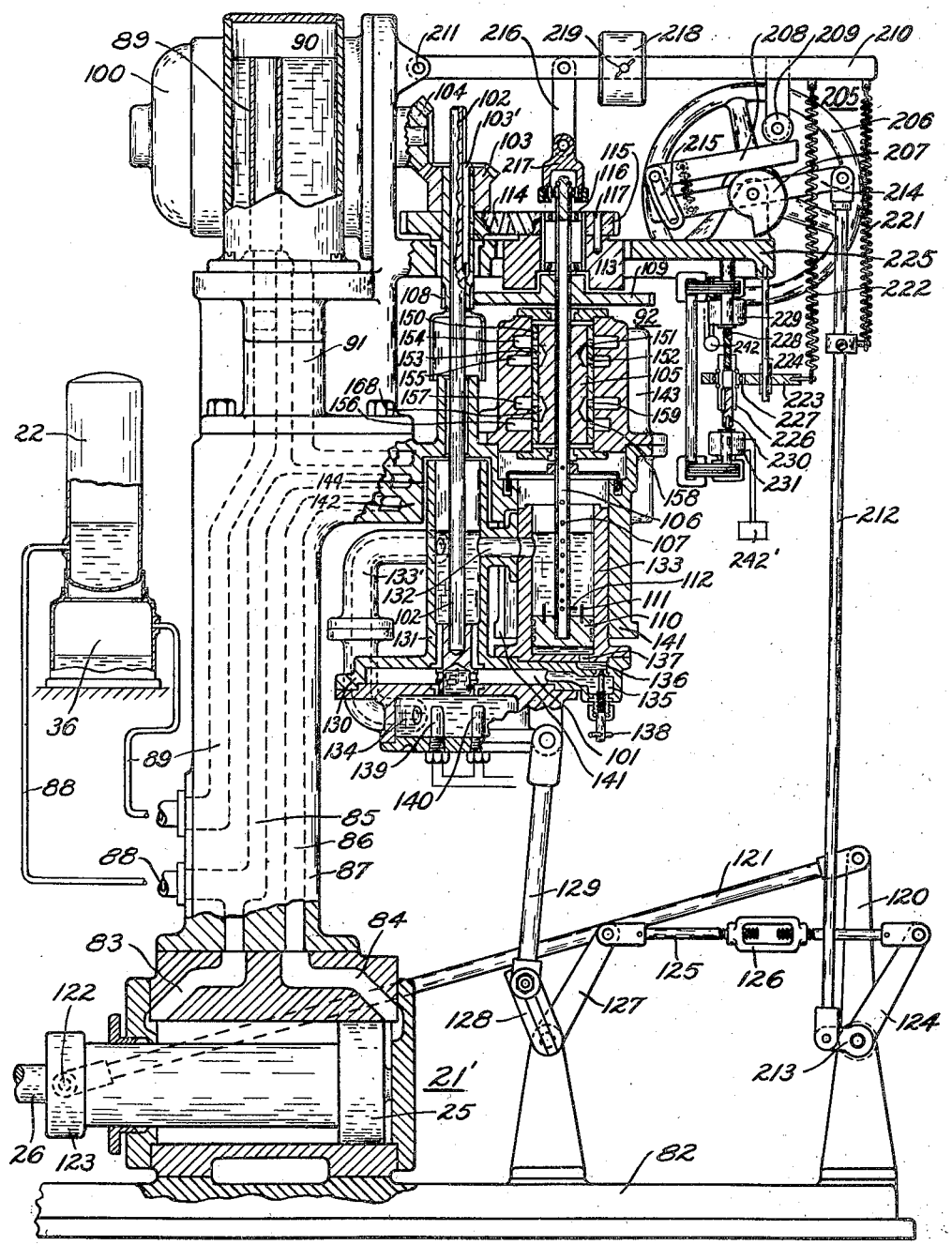
Fig. 2 is a similar section partly in elevation of another embodiment of my invention wherein the impeller and valve are mounted on different shafts.

A distinct difference between the governor shown in Fig. 2, which is the preferred form of my invention, and the simple apparatus illustrated in Fig. 1, is that in Fig. 2 the impeller is not axially movable with respect to its casing and is disposed separately from the valve the pressure created thereby being communicated to a piston connected to the valve for imparting axial movement to the latter In both cases, however, the connections between the inertia mechanism and the valve are such that the tendency to axial movement of the latter is increased or diminished in accordance with the positive or negative acceleration of the inertia mechanism.

Referring to Fig. 2, mounted on a suitable base 82 is a servomotor 21' of the trunk piston type, provided with ports 83, 84, communicating with passageways 85, 86, which may be pipes enclosed within the column 87 rising from and appropriately secured to said servomotor. The pipe 85 is connected by the pipe 88 to the pressure tank 22, and the sump 36 is connected to the pipe 89, a portion of which may be enclosed within said column and extends to near the top of the standpipe 90, mounted on and secured to the column 87. Enclosed within said column also, is the pipe 91 leading from the bottom of said standpipe to one of the ports of the balanced valve 92. It will be understood, of course, that the several passageways designated as pipes may be ducts cored into said column 87. The paths of the fluid between the pressure tank and the servomotor by way of the interposed valve 92, are shown in detail in Fig. 3, hereinafter to be described, and the details of the balanced valve 92, which preferably is employed, will be explained in connection with Figs. 9–13, inclusive.

To drive the impeller or centrifugal pump at a rate proportional to the speed of the prime mover to be governed, any suitable means may be employed, and, in the present instance, I have shown for this purpose a synchronous motor 100, suitably mounted on the column 87 behind the standpipe, for driving the impeller 101, mounted for rotation on the shaft 102 splined to the bevel gear 103, as indicated at 103', meshing with the bevel gear 104 on the shaft of the synchronous motor. The valve element 105 of the balanced valve 92 is mounted for rotation on the rod 106, which, preferably, is hollow, and the lower portion of which, preferably, is provided with a number of apertures 107. By the speed reducing gears 108, 109, the valve element 105 and the piston 110, connected in any suitable manner to said rod at the lower end thereof, are rotated at a relatively low rate of speed for the purpose of reducing the resistance to axial movement of the valve element and said piston. The valve element and piston are loosely coupled to the valve rod, as above described in connection with Fig. 1, for the purpose therein stated, and, in the present instance, the connection between the piston and rod is afforded by one or more pins 111 rising from the upper face of the piston and co-operating with a pin 112 extending laterally from the piston rod.

It is advisable to rotate the impeller and piston independently, in order to eliminate the wear on the outer diameter of the piston, which, in the case of Fig. 1, is comparatively large, and also to eliminate or reduce the whirling motion of the liquid above said piston, which in the case of Fig. 1 is checked by the vanes 52. It will be readily understood, of course, that the impeller must have a relatively high rate of speed and that by separating the combination piston and centrifugal pump or impeller of Fig. 1, in the manner shown in Fig. 2, the rotational speed of the piston may be made as small as desired, while at the same time permitting the impeller 101 to rotate at as high a speed as may be necessary to develop sufficient hydraulic pressure to impart axial movement to the valve.

A relatively small flywheel 113 is mounted for rotation about the valve rod for the purpose hereinbefore described in connection with Fig. 1, and such rotation is effected in the present instance by the helical gear 114 splined to the shaft 102 to permit the latter to slide through said gear which meshes with the helical gear 115 mounted for rotation about the valve rod in any suitable manner, ball bearings 116 preferably being interposed between said gear and rod.

The inertia element comprising said helical gears and flywheel performs the same function and effects the same result as already explained in connection with Fig. 1. As indicated in Fig. 2, the connection between the gear 115 and the flywheel is made by means of a pin 117 which is rigidly connected to and projects from the lower face of said gear and enters an aperture in the upper face of the flywheel, but a friction mount, such as shown in Fig. 1, may be used.

While anti-racing connections are indicated in Fig. 2, it is to be understood, as explained more fully in connection with Fig. 6, that the use of such connections to check the motion of the servomotor piston and make the governor a dead beat device (that is, one which will return the valve to its neutral position at substantially the instant at which the speed of the prime mover is restored to its normal value) is unnecessary.

The anti-racing connections in the present instance comprise a bell crank having an arm 120 pivotally connected to one end of the rod 121, the other end of which is pivoted to an arm 122 extending laterally from the servomotor piston rod 26 and secured thereto by the collar 123; and an arm 124, which by the link 125, the length of which may be adjusted by the turnbuckle 126, is connected to one arm 127 of a bell crank, the other arm 128 being adjustably connected to the rod 129.

The casing 130 in which the impeller or centrifugal pump is disposed, is located at the lower end of the cylinder 131 through which the impeller shaft passes, and said cylinder 131 communicates by a passageway 132 with the cylinder 133 within which the piston 110 is located. The cylinder 133 is filled with oil or other suitable fluid, which, by the action of the centrifugal pump, is drawn through the pipe 133' into the reservoir 134 and forced through the chamber 135, and by the ports 136, 137, enters the cylinder 133 below the piston, thereby imparting thereto an axial movement depending, among other things, upon the speed of rotation of the prime mover, such flow being regulated by the adjustable needle valve 138.

A thermostat 139 and heating unit 140 may be employed to maintain the temperature and therefore the density of the oil, or other fluid employed, constant.

The impeller casing and the cylinders 131 and 133, together with the pipe 133' and reservoir 134, are connected together as a single unit capable of axial movement when acted upon by the connecting rod 129, said unit being guided in such movement by the piston housing 141 formed in the lateral extension 142 integral with the column 87 and secured to the lower end of the valve housing 143. Thus, when the speed of the prime mover the speed of which is to be governed increases and the servomotor piston moves outwardly, the anti-racing connections will move the cylinders 131, 133, downwardly, thereby reducing the hydraulic pressure which acts on the piston 110, and thus checking the overtravel of the servomotor piston and preventing racing, as above explained in connection with Fig. 1. The piston 110, together with the axially movable cylinders 131, 133, and the impeller 101, performs the functions of a dash pot with all the advantages heretofore set out in connection with the description of the piston 40 of Fig. 1.

As in the case of Fig. 1, when the speed of the prime mover is normal, the valve 92 is in its neutral position, the weight of said valve and all parts connected to the valve rod being balanced by the hydraulic pressure developed by the impeller and impressed upon the piston 110. When the speed changes, the actual change in the speed of the impeller will vary the hydraulic pressure imposed upon the piston 110, and the thrust on the driven spiral gear 115 due to acceleration or retardation of the speed, will, in combination with the variation in pressure developed by the impeller, alter the position of the valve and restore the speed of the prime mover to normal.

Although the above described means actuated by the servomotor to react upon the valve during its return to neutral position in order to prevent racing or hunting, may be employed to vary the effect of the hydraulic pressure on the valve, it is to be borne in mind that the use of such anti-racing connections is optional and that by the proper proportioning of the several moving parts, including the peripheral angle of the teeth of the helical gears, the speed of the prime mover may be restored to its normal value without the use of such connections. This is one of the salient features of my invention.

Figure 3:
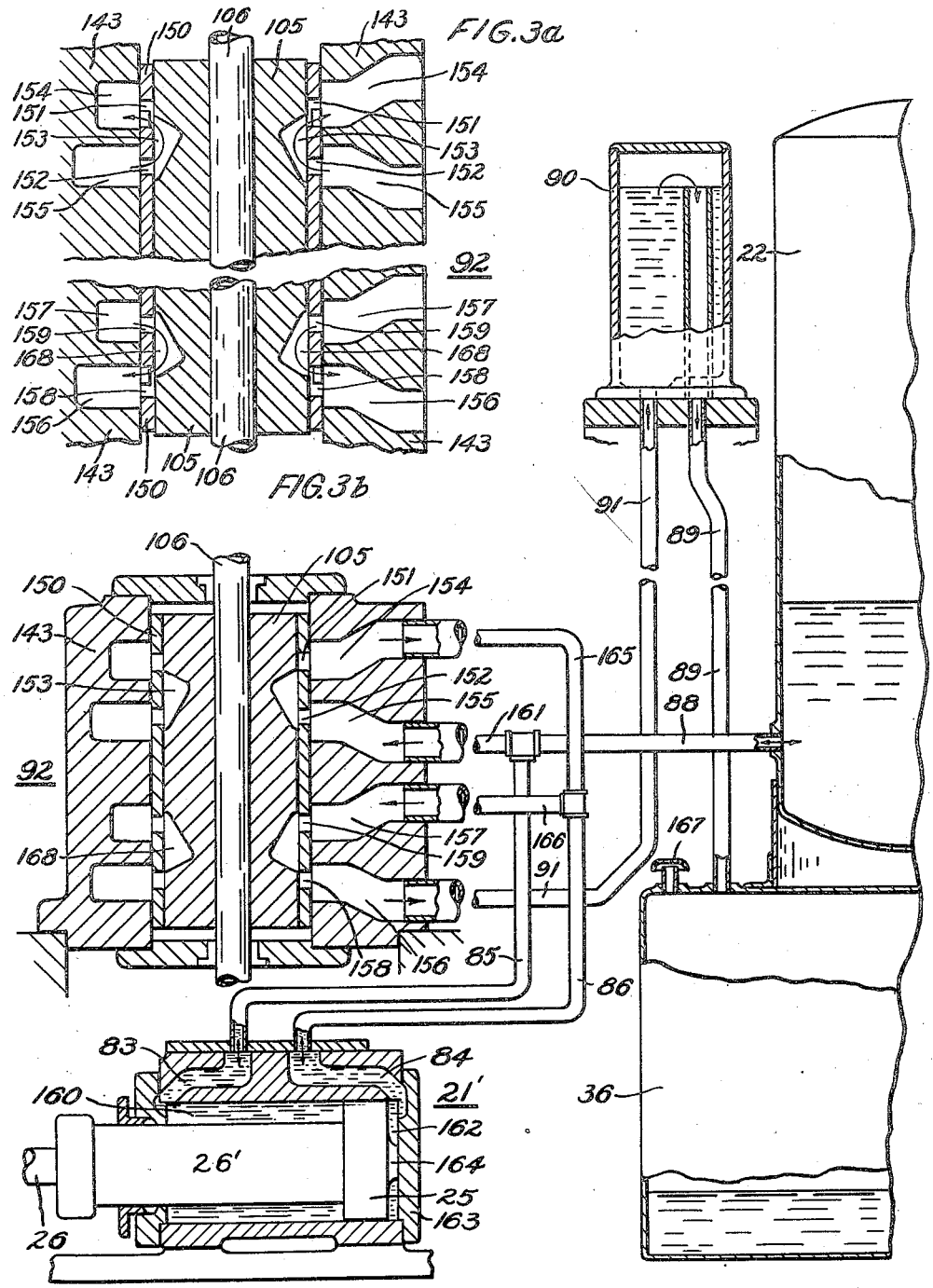
Fig. 3 is a diagrammatic view, partly in section and partly in elevation, illustrating the paths of the fluid from the source of fluid pressure to and from the valve and to and from the servomotor cylinder.

By reference to Figs. 3 and 3a, I shall now explain the connections of the valve ports to the pressure tank and servomotor that are now preferred by me.

The valve 92 comprises a stationary ported sleeve 150 and valve element 105, preferably rotatable, enclosed therein.

The sleeve is provided near its upper end with a plurality of annular outlet ports 151 spaced outwardly from the annular intake ports 152, and the valve element is provided with a specially contoured peripheral groove 153 arranged to connect the intake and outlet ports upon the outward or upward movement of said valve element. In the upper portion of Fig. 3a, the valve element has moved upwardly and the ports 151, 152, are in communication via said groove, as indicated by the arrows.

The upper portion of the valve housing 143 is provided with annular ports 154, 155, communicating with the sleeve ports 151, 152, respectively, and the lower portion, with annular ports 156, 157, communicating with the sleeve ports 158, 159, respectively, said ports and the tank 22, the standpipe 90, the sump 36, and the servomotor parts 83, 84, being so interconnected by a series of pipes or passageways cored in the body of the governor that no air pockets can be formed in the circulatory system. Fig. 3 shows schematically, an oil circulatory system which has been found effective in practice for securing this result and is the one now preferred by me.

The tank 22, which contains oil maintained under pressure by a pump, not shown, is connected by the pipe 88 and the pipe 65, coupled thereto, to the servomotor port 83 and the annular space 160 around the enlarged portion 26' of the piston rod 26, and by said pipe 88 and the pipe 161, also coupled to said pipe 88, to the intake port 155 of the valve housing and the intake port 152 of the valve sleeve.

The space 162 between the inward face of the piston 25 and the inward cylinder head 163, maintained when the piston is at the end of its inward stroke by the boss 164 on the inward face of the piston, and the servomotor port 84, are both connected to the valve housing outlet port 154 and to the sleeve outlet port 151 by the pipe 86 and its extension 165. Said space 162 and port 84 are both connected to the housing intake port 157 and the sleeve intake port 159, by said pipe 86 and the pipe 166 coupled thereto.

Oil may flow in either direction in the pipes 85 and 86 to and from the servomotor ports 83 and 84, respectively, and in the other pipes, the directions of flow are indicated by arrows.

The standpipe 90 receives oil discharge through sleeve outlet port 158 and housing outlet port 156 by pipe 91 and discharges it through pipe 89 into the sump tank which is open to the atmosphere by the vent 167.

In Fig. 3a, the valve element 105 is shown broken into an upper and a lower part in order to illustrate the paths of the oil for both outward positions thereof, but it will be understood, of course, that when the upper sleeve ports 151, 152, are connected by the annular groove 153, the lower sleeve ports 158, 159, are never connected by the annular groove 168, and conversely. In the upper half of Fig. 3a, the valve element is represented as having moved outwardly, i. e., upwardly from its neutral position when the governor is disposed vertically, and established communication between the sleeve ports 151, 152, by way of the annular groove 153. In the lower half of Fig. 3a, the valve element has moved outwardly, i. e., downwardly from its neutral position, and put the sleeve ports 158, 159, into communication by way of the annular groove 168.

The word "outwardly" is employed to designate the direction of motion of the valve element that will connect the sleeve intake ports with their respective outlet ports. Thus, when the governor is disposed vertically (it may be placed horizontally, as shown in Fig. 7), the upward movement of the valve element whereby the sleeve intake port 152 is connected with sleeve outlet port 151 via the groove 153, is termed "outward" with respect to the upper half of the valve, and the downward motion of said element whereby the sleeve intake port 159 is connected with sleeve outlet port 158 via the groove 168, is termed "outward" with respect to the lower half of the valve.

The flow of oil in the case of an increase in load on the prime mover, is as follows:

Responding to the decrease in speed of the prime mover due to the increase of load, the valve element drops below, or outwardly from, its central or neutral position, thus putting ports 158 and 159 into communication through annular groove 168. Oil then flows from tank 22 into the space 160 in the servomotor cylinder, through pipes 88 and 85, and the servomotor port 83, since the oil in the space 162 is now free to flow through pipes 86 and 166 into intake port 157, and thence through annular groove 159, outlet port 158 and pipe 91 into the standpipe 90, and thence by pipe 89, into the sump tank, with no pressure above that of the atmosphere to oppose the pressure of the oil thus forced by the piston 25 from said space 162. It will be understood, of course, that all of the connecting pipes are sufficiently large to make negligible the opposing pressure due to frictional resistance to oil flow from said space 162 into the sump tank. In this case, no oil will flow in pipes 161 and 165, since ports 151 and 152 are not in communication when the valve element is below its neutral position. Thus, the servomotor piston moves to the right and increases the gate opening, thereby bringing the speed of the prime mover back to normal.

In the case of a decrease in load on the prime mover, the speed increases and the governor mechanism moves the valve element above or outwardly from its central position, thereby putting ports 151 and 152 into communication and blocking communication between ports 158 and 159. The oil at that time in standpipe 90 will flow out through pipe 89 into the sump until its level is below the top of said pipe; thus, port 158 and pipe 91 remain filled with oil. This provision is made so that on the next downward or inward movement of the valve element, oil from pipe 166 will flow into a space filled with oil instead of air, thereby securing smoother operation of the governor. Simultaneously with the draining of the standpipe, as described above, oil will flow from space 160 in the servomotor cylinder into intake port 152, through pipes 85 and 161, and also from tank 22 into said port through pipes 88 and 161. The oil from both sources thence flows through annular groove 153, outlet port 151, and pipes 165 and 86 into the space 162 in the servomotor cylinder. This flow occurs because the inward side of piston 25 facing said space 162 has twice the effective area of its outward side, which faces space 160, and exerts twice the force on the piston with approximately equal pressure on both sides. This piston thus moves to the left, reducing the flow of water into the prime mover and thereby bringing the speed thereof back to normal.

I have already adverted to the fact that an important feature of my invention is the use of the impeller-inertia-element combination to prevent racing; that is, to return the valve to its neutral position simultaneously, or substantially simultaneously, with the restoration of the prime mover speed to normal without employing for this purpose the anti-racing connections heretofore found necessary. This result, which I believe is broadly new with me, may be effected by the simple expedient of removing the floating lever 60 and the link 61, in the case of the governor shown in Fig. 1, and by removing the links and levers 124, 125, 127, 128, 129, in the case of the governor shown in Fig. 2, and also locking the cylinders 131, 133, and all their attachments, in fixed position.

The embodiment of my invention shown in Fig. 6, hereinafter to be described in detail, will, without alteration, accomplish the same result. It will be understood, of course, that in all cases, the weight and proportions of the fly wheel and the ratio of the helical gears must be so chosen that the combined effects of the speed of the prime mover operating on the impeller, and the acceleration or retardation of said prime mover operating on the inertia element, will cause the valve to return to its neutral position at about the same time as the prime mover speed returns to normal. In all three cases, that is. in the apparatus of Figs. 1 and 2 modified as above stated, and in the apparatus of Fig. 6, substantially the following relation of the various factors obtains, to wit:

$$P = te^{-t}$$

$$N = t\left(1 - \frac{t}{2}\right)e^{-t}$$

$$Q = k\left[t\left(1 - \frac{t}{2}\right)\right]e^{-t}$$

$$R = \left(1 - 2t + \frac{t^2}{2}\right)e^{-t}$$
$$S = k(1-t)e^{-t}$$

where:
P is the valve position desired;
N is the speed of the prime mover, such as a water wheel;
Q is the force acting on the valve due to the impeller or centrifugal pump;
R is the force acting on the valve due to the inertia element; and
S, which is the algebraic sum of Q and R, is the net force acting on the valve.

Figure 8:
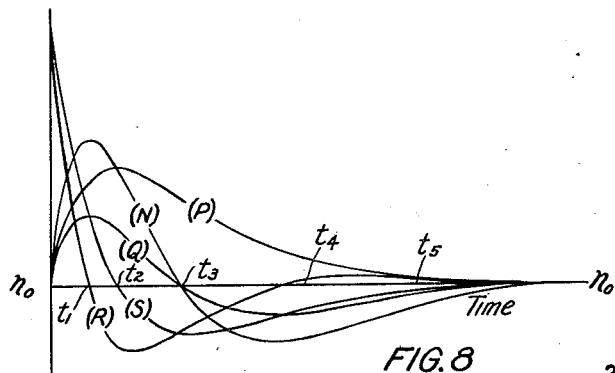
Fig. 8 is a diagram showing a family of curves drawn to rectangular coordinates in which the abscissae represent time and the ordinates, valve positions, turbine speeds, and various forces, such diagram being used to explain the action of the governor shown in Fig. 6 and the governors of Figs. 1 and 2, modified as hereinafter set forth.
Figure 12:
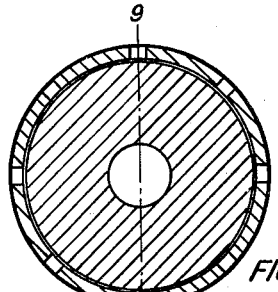
Fig. 12 is a transverse section taken on the line 12—12 of Fig. 9.
Figure 13:
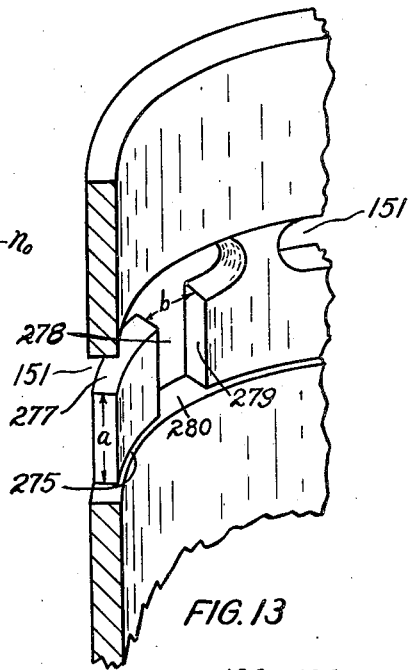
Fig. 13 is a perspective view on an enlarged scale showing details of the ports in the valve sleeve.
Figure 9:
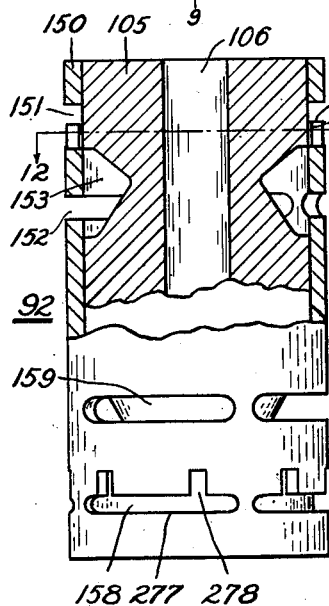
Fig. 9 is an elevation partly in central vertical section on the line 9—9 of Fig. 12, showing a balanced valve embodying my invention.
Figure 10:
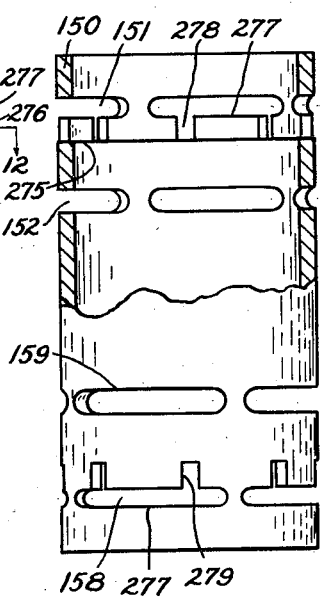
Fig. 10 is an elevation partly in central vertical section showing the valve sleeve of said balanced valve.
Figure 11:
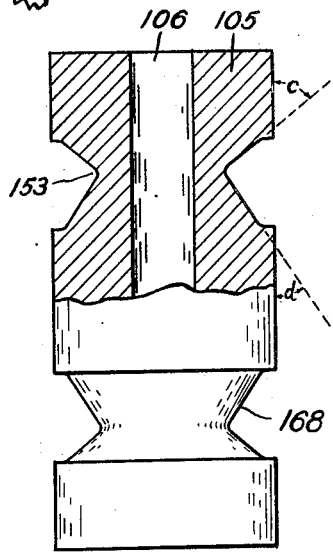
Fig. 11 is an elevation partly in central vertical section showing the valve element of said balanced valve.

These relations are shown graphically in Fig. 8, in which the abscissae represent time, and the ordinates, the magnitudes of the quantities involved.

The zero ordinate $n_0$ is the normal speed of the prime mover which is being governed. It will be clear from these curves that the combined effect on the valve of the forces due to the impeller and inertia element is to bring said valve to neutral position at substantially the same time as the prime mover speed returns to its normal value.

Fig. 8 shows that the force R on the valve, due to the inertia measuring element, is decidedly out of phase with the force Q acting thereon, which originates in the speed measuring element or centrifugal impeller. In consequence of this relationship, the tendency to sustained oscillation of the speed governors of the prior art, known as "hunting" or "racing" is definitely eliminated, so that my improved governor is a dead beat device even without the use of one of the conventional anti-racing mechanisms hereinbefore described.

In a turbine or other prime mover which it is desired to hold to a speed of $n_0$ revolutions per minute regardless of load changes, said turbine being supplied with water through a gate whose opening is controlled by a hydraulic cylinder, such as the servomotor 21, and said cylinder being under the control of the valve 92, the valve is subjected to a constant downward force due to its own weight and to the weight of the piston, helical gear, and flywheel, which are rigidly connected to it as regards vertical motion.

The impeller shaft is suitably connected for rotation by the water wheel, so that its rotational speed is constantly proportional to the speed of said wheel. Said shaft drives both the pump and the flywheel, the latter by means of a pair of spiral gears, so chosen that the axial thrust of the driven gear is upward under conditions of increasing water wheel speed. It will be understood that uniform speed thrust is made negligible by the use of an anti-friction mounting for the flywheel and driven gear.

Opposing the downward force on the valve mentioned above is the fluid pressure on the piston due to the pump. By suitable choice of weights, pump impeller and piston diameters, and drive ratio between the water wheel and impeller shaft, these two forces are made to equal each other at the desired water wheel speed $n_0$. It will be understood that the hydraulic cylinder controlling the supply of water to the turbine or other prime mover is so arranged that upward motion of the valve decreases the amount of water available to the said turbine, and therefore tends to decrease the speed thereof, other conditions remaining constant.

Assuming that the external mechanical load on the prime mover decreases and that such load change takes place in an indefinitely short interval of time, it will be apparent that the valve in order to bring the water wheel back to the desired speed, must rise and then drop back to its neutral position. The return of the valve to neutral position must furthermore occur very nearly at an instant at which the waterwheel speed is the desired one, otherwise the valve would immediately rise or drop away from the neutral position again. The curve P indicates a satisfactory type of valve movement, meeting both the requirements just stated.

For all practical purposes, the change in fluid pressure under the piston corresponding to a change in speed of the impeller or pump may be taken as directly proportional to that change in speed, so that the pressure curve Q showing the variation of the upward force on the piston due to the pump, necessarily follows the speed curve N which is, in fact, precisely the curve that the speed of a water wheel would follow, given a sudden decrease in load, and a controlling valve displacement such as that shown by the curve P. This pump force, however, acting alone, would not produce a valve displacement such as that shown; indeed, were this the case, the valve would merely rise, and remain displaced until the wheel speed had fallen far below the desired value. The necessary additional force is provided by the inertia element. The action of this inertia element is as follows:

At the instant that part of the load on the water wheel is dropped, the force supplied by the water then flowing into the turbine, plus the reservoir of force convertible from the kinetic energy thereof, is greater than that required to maintain the same at normal speed. This additional force is available to accelerate the flywheel, and does subject the same to an acceleration such as is indicated by the initial point of curve R. In transmitting this acceleration to the flywheel, the driving spiral gear produces an upward thrust upon the driven gear and consequently upon the valve. This thrust aids the force due to the pump and produces a much more rapid rise of the valve than would otherwise be possible. In consequence, however, of the rise of the valve, the turbine gate begins to close, less water flows therethrough, and the acceleration diminishes rapidly, as shown by curve R, and becomes zero at the instant $t_1$, which is the instant that the turbine wheel speed change is checked, and immediately thereafter the curve R becomes negative.

Since the speed at this instant is still higher than $n_0$ the upward force due to the pump remains greater than the weight of the valve system, and the valve continues to rise. The gates, therefore, close still further and the acceleration reverses its direction, now retarding the wheel. Moreover, the thrust due to the inertia element also reverses and opposes the upward force of the pump. As a result, at the instant $t_2$ the net force S due to both the pump and the inertia element, becomes zero, and the valve ceases to rise. After the instant $t_1$, the speed, which had been steadily rising up to that time due to the excessive supply of water, begins to decrease, at the instant $t_2$ it has already fallen below the maximum, and the pump force Q has also decreased. The valve, however, is still above neutral, and the gate is still closing, but as the gate closes the now downward thrust of the inertia element increases, and the upward force of the pump decreases with the decreasing speed, with the result that the valve is forced down. The speed may drop below $n_0$ before the valve returns to neutral, as shown slightly beyond the point $t_3$.

When this happens, the supply of water to the turbine and the speed thereof will again be disproportionate, and the inertia element force will again aid the pump, but as the pump force is then less than is required to balance the weight of valve system by such an amount that there is no tendency for the valve to rise, said valve continues to fall relatively slowly toward its neutral position, as shown by that portion of curve P between $t_4$ and $t_5$. All of the forces acting on the valve, as well as the turbine speed and the water supply, are thus approaching their normal constant load values, and in fact, reach normal value at very nearly the same time, so that there is no tendency for further changes to take place until some new change in the external load on the wheel initiates another cycle of operation.

The conditions of operation, and the resulting changes and motions described above are somewhat oversimplified. Under actual operating conditions, the behavior of the governor would depart from that described to a greater or lesser extent, depending on the amount and rapidity of the original load change, the loading of the wheel, water and penstock conditions, and other factors. Nevertheless, the forces involved would still act in the same directions, and arrive at the same final balanced state, as I have demonstrated in practice. In the case of an increase in load instead of the decrease discussed above, all forces and all reactions would simply be reversed in direction.

In Fig. 6 showing an embodiment of my invention wherein the valve is returned to neutral position at about the same time the speed of the prime mover is restored to normal without the use of anti-racing connections, the flywheel 70' is mounted for rotation about the valve rod by the helical gearing already described, and is disposed on and for frictional movement with the flange 75' fixedly secured to the hub 170 of the driven gear 115, ball bearings 116 preferably being interposed between said hub and said rod.

The impeller 101' is mounted on the countershaft 171, journalled in the flange 172, extending from the valve housing 143', and the collar 173, secured to and passing upwardly from the impeller casing 174. Any suitable means, such as the pulley 175, on the impeller shaft and a belt, not shown, may be employed for connecting said shaft for rotation by the prime mover at a speed which is, of course, proportional to that of said prime mover.

The valve rod 106 being relatively short, the piston 110' may be formed integral therewith and is disposed for rotary and axial movement in the cylinder 176 formed in the partition between the reservoirs 177 and 178. By means of the pipe 133' said reservoir 177 is connected to the reservoir 134.

While the impeller or centrifugal pump may have any suitable construction, I prefer to employ one comprising a disc having a plurality of radial holes 179, whereby the oil in the reservoir 177 will be drawn through the pipe 133' to the lower reservoir 134, and thence upwardly and outwardly through said holes 179 to the reservoir 178 for imparting to the lower face of the piston 110' suitable hydraulic pressure for the purpose already described in connection with Figures 1 and 2.

While not absolutely essential, better results are obtained by the use of an impeller in which the head or hydraulic pressure produced, is due substantially to the tangential speed component of the motion of the liquid so that for any given speed, such hydraulic pressure imparted to the piston is invariable. This feature is claimed in my divisional application Ser. No. 63,953, filed December 7, 1948. In the present instance, the upper portion 180 of the outer peripheral surface of the impeller abuts the inner periphery of the casing 174, and the lower portion of the outer periphery of the impeller terminates short thereof, thereby affording a space or passageway 181. In other words, the passageway between the periphery of the impeller and the inner surface of the casing is substantially at right angles to the axes of the holes 179, so that the hydraulic pressure developed by the impeller is due substantially to the tangential speed component of the liquid which the impeller tends to move into the lower reservoir 178 to impart hydraulic pressure to the piston 110'. To prevent rotation of the liquid in the reservoir 178, the central part 178' of the lower surface thereof immediately below the impeller, may project upwardly, and the outer edge 178" of such projecting portion may terminate just short of the lower surface of the impeller, the area of the projecting portion being coextensive with that of the impeller. The outer circumference of said projection, together with the lower portion of the cylindrical wall of the casing 174, forms a continuation of the space or passageway 181.

In view of the foregoing, it will be apparent that the governor shown in Fig. 6 requires no anti-racing connections to restore the valve to its neutral position at substantially the same time the prime mover speed returns to normal, and it will also be seen that the acceleration-measuring inertia element may be applied to existing systems in which ball or weighted governors, or like centrifugal devices, are used to impart axial movement to a valve interposed between a servomotor and a source of fluid pressure, said inertia element acting in conjunction with such centrifugally actuated weighted devices in substantially the same way in which it co-acts with the impeller-created force imposed upon the piston connected with the valve in the present invention.

Figure 4:
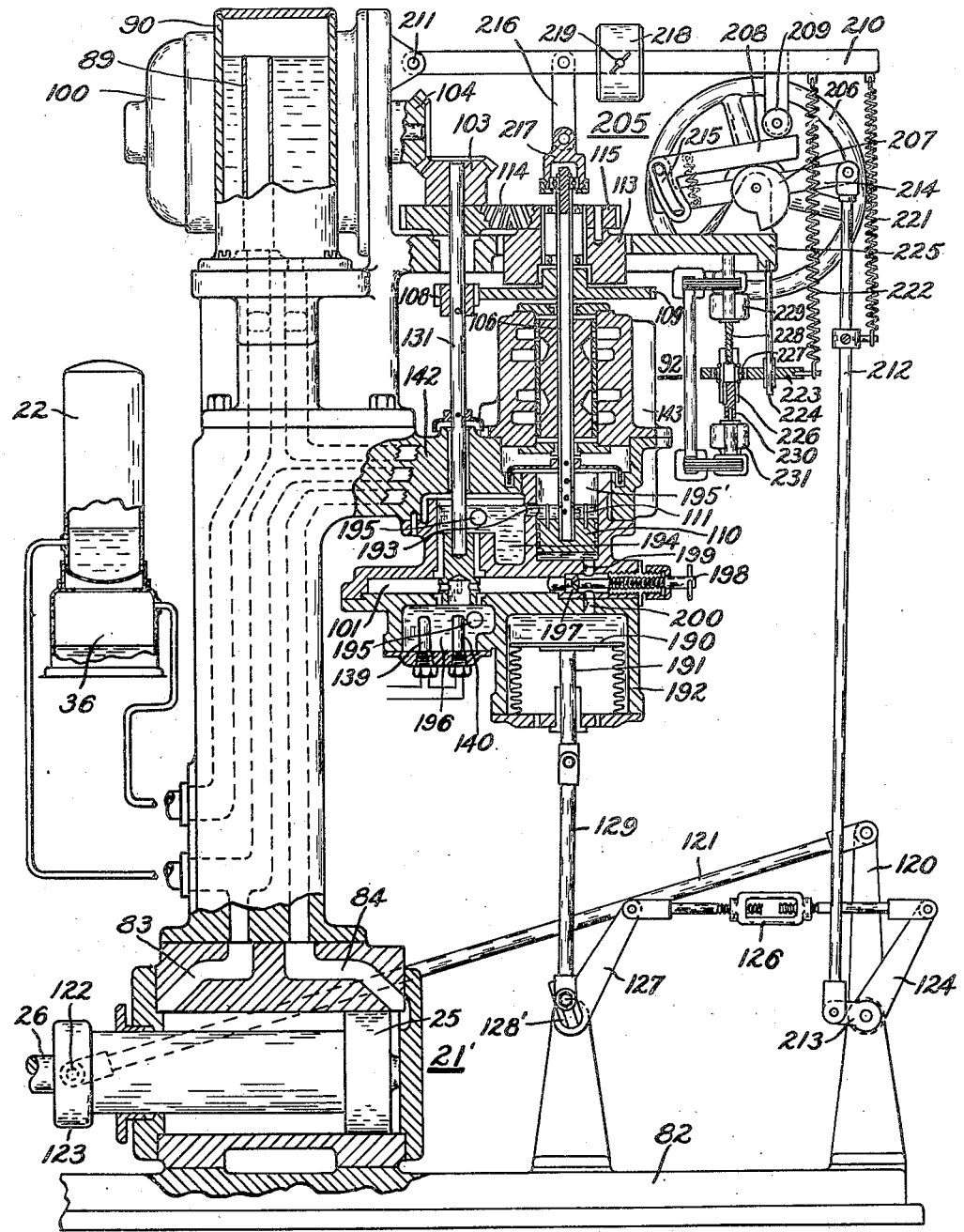
Fig. 4 is a central vertical section partly in elevation of a modification of Fig. 2, illustrating the use of a Sylphon bellows actuated by the servomotor for preventing overtravel of the valve upon the return thereof to its neutral position.

It will be noted that in Figs. 2, 4, and 6, the valve is freely mounted and is supported when in steady-state operation solely by the liquid with which the lower face of its attached piston 110 or 110' co-operates and the force due to said liquid in steady-state operation is opposed by a constant force equal thereto, i. e., a force which does not increase or decrease with the movement of the valve, with the result that there is no distance limitation in the movement of the valve and the piston thereto attached so that such piston and valve will continuously rise or fall so long as there is a speed differential, from which follow the advantages hereinbefore set out.

In Fig. 4 I have shown hydraulic means actuated by the anti-racing connections for varying the effect of the impeller-created hydraulic pressure on the valve, such means consisting of a Sylphon bellows 190, or any other suitable form of piston, the stem 191 of which is shown in the present instance as pivotally connected to the rod 129, and thence through the bell crank 127, 128', and link 126 to the arm 124 of the bell crank, one of the other arms 120 of which is connected for actuation by the servomotor through the rod 121.

By the connections above set out, the cubical content of the cylinder 192 enclosing said Sylphon bellows is varied. The impeller draws oil from the piston cylinder 195' communicating by the port 193 with the reservoir 194 through the pipe 195 which connects said reservoir with the receptacle 196, and thence delivers it to the lower part of said cylinder 195' by way of the port 197 controlled by the needle valve 198 and the port 199. The ports 200 and 199 connect the cylinder 192 with the lower portion of the cylinder 195'. Thus, the movement of the Sylphon bellows will displace the oil in the lower part of the piston cylinder and produce the same effect thereupon, and consequently upon the valve 92, as is produced by the movement of the impeller cylinder 133 in that embodiment of my invention shown in Fig. 2. An advantage is obtained by the use of the construction shown in Fig. 4, in that the size of the apparatus is reduced and several moving surfaces are eliminated by employing the hydraulic equivalent of the axially movable cylinders 131, 133, and their attachments shown in Fig. 2.

For completeness of disclosure, Fig. 4, and also Fig. 2, illustrate also a standard form of hand actuated maximum gate control 205, comprising the hand wheel 206 for rotating the cam 207 which co-acts with the follower lever 208, the latter co-operating with the follower disc 209 to move the lever 210 about its pivotal connection 211 with the body of the governor. The position of the follower lever may be changed by the servomotor acting through the rod 212 pivoted to the third arm 213 of the bell crank, the other two arms of which are 120, 124, said rod being pivoted to the lever 214 connected by a pin and slot coupling 215 to said lever 208. The lever 210 is connected with the valve rod 106 by the links 216, 217, ball bearings being interposed between said link 217 and said valve rod.

The hydraulic pressure required to be imposed upon the piston 110 in order to maintain the valve in its neutral position, is, of course, determined by the weight of the valve and valve rod and the elements carried thereby. A portion of the weight on the valve rod consists of the lever 210 and the counterpoise 218, said counterpoise affording means for adjusting the weight carried by the valve rod to provide for slight speed adjustments in the prime mover and therefore in the impeller; in other words, a convenient means for insuring the neutral position of the valve at the normal speed of the prime mover if slight error should have been made in determining the ratio of the spur gearing 108, 109, or any other material factor governing the neutral position of the valve which is balanced by a definite pressure, gravity in the case of Figs. 2 and 4, and spring pressure in the case of Fig. 7.

Various other refinements are illustrated in Figs. 2 and 4 which although not essential to the functioning of my improved governor are desirable for practical speed governing. By the very light spring 221 having its respective ends connected to the lever 210 and the rod 212, any amount of bias may be impressed upon the valve to obtain any desired degree of speed droop, and for other purposes well understood by those skilled in the art.

For a further refined speed adjustment necessary in modern power systems to which electric clocks are connected, a very light biasing spring 222 is connected at one end to the lever 210, and at the other, to an arm 223 which has slidable connection with the rod 224 secured to and depending from the overhanging ledge 225 integral with the body of the apparatus. The arm 223 is connected to the differential nut 226, preferably, by means of ball bearings 227, and said nut is in threaded engagement with the shaft 228 of the synchronous motor 229 and is splined to the shaft 230 of the synchronous motor 231.

One of said synchronous motors is energized by the current developed by the generator 242 driven by the prime mover the speed of which is to be governed, and the other, by a current of standard frequency 242', that is, by a source of periodic function of time. The shafts of the synchronous motors have the same direction of rotation, and, therefore, if the system being regulated has the same average frequency as the frequency desired, both motors will revolve at exactly the same speed, and the nut will remain stationary; but if there is an error in the system being regulated, the nut will move upwardly or downwardly along the threaded shaft 228, as the case may be, and the tension of the biasing spring 222 will be altered to correct such error. In lieu of the two motors above described, there may be used a synchronous motor having its rotor and stator elements energized, one, by the frequency of the generator, and the other, by a standard source of periodic function of time, as described more in detail in connection with Fig. 15. By either of the synchronous motor-operated biasing means, integrated frequency error is corrected and an exact equality of average frequency between the prime mover driven generator and the standard will be maintained.

The governor shown in Fig. 5, wherein the inertia element and helical gears are not used, illustrates the application of another salient feature of my invention, which, as I am at present advised, is broadly new with me, viz., the substitution of the speed measuring impeller to impart axial movement to the valve for the centrifugally actuated weighted devices heretofore employed for that purpose. In this figure, the impeller 40 of the type shown in Fig. 1, is connected directly to the valve rod 41, and the latter is rotated at a speed proportional with that of the prime mover by the synchronous motor 240 connected by the line 241 with the generator 242 driven by the turbine 243, the supply of water to said turbine being controlled by the servomotor 21', the piston rod of which is connected by the slotted link 244 to the valve or gate mechanism through which the supply of water is delivered to said turbine. For purpose of illustration, the valve 92 governing the supply of fluid pressure to the servomotor is of the same type as that shown in Fig. 2.

Any convenient means, such as the apertured discs 245, disposed on the flange 246 of the hub 247 through which the valve rod projects, may be employed to vary the definite downward force acting on the valve rod, which must be balanced when the prime mover speed is normal, by the hydraulic pressure developed by the impeller. By means of the linkage 248, 249, 250, the impeller casing 50 may be moved axially to vary the effect of said hydraulic pressure on said valve in such manner as to prevent racing, as above described in connection with Fig. 1.

The governors shown in Figs. 5 and 6 are isochronous governors, that is, the normal speed of the prime mover is independent of the load thereon and even of the valve position; and the actual speed, except during the periods in which a correction for overspeed or underspeed is being made, is the same as the normal speed. The governor shown in Fig. 1 is isochronous in the sense of being independent of the load, and, when a balanced valve, such as that shown in Figs. 3 and 3a, is employed, (see Fig. 5) is isochronous in the full sense of being independent of both load and valve position. The governors shown in Figs. 2 and 4 are isochronous governors when the biasing spring 221, which, as above stated, is a nonessential refinement, is not used (see Fig. 6).

The governor shown in Fig. 7 is in all respects identical in principle and mode of operation with that illustrated in Fig. 6, wherein the definite force moving the valve axially is the force of gravity.

In Fig. 7, the governor is positioned horizontally, and such definite force is provided by the spring 251, one end of which is attached to the lever 252, and the other, to an adjusting screw 253 mounted on the bracket 254 rising from the body of the apparatus. Said lever 252 is pivoted at its lower end to the bracket 255 and is coupled to the valve rod 106 by the links 216, 217. The impeller 101' is disposed within the casing 174 and mounted on the shaft 171', journalled in the bearings 173 and 256. By means of the pulley 175 and a belt, not shown, or by other suitable means, the impeller is rotated by the prime mover the speed of which is to be governed. The valve rod and the valve, together with the piston 110' secured thereto, are rotated at relatively low speed by the counter-shaft 257 and the speed reducing spur gears 108, 109. The countershaft to which the driving gear 108 is attached, has its bearings at 258, 258, and is driven by the impeller shaft through the bevel gears 259. The flywheel 260 is mounted to rotate about the valve rod and is attached thereto frictionally for the reason already explained in connection with Fig. 1. In the present instance, the flanged sleeve 261 which extends through the central aperture in the flywheel, is provided at its outer end with a washer 262, shown in the present instance as threaded thereto, and interposed between said washer and the outer face of the reduced central portion of the flywheel are a plurality of plate springs, of which two are shown at 263, 263, whereby the flywheel is retained in frictional engagement on said sleeve 261. Ball bearings 264, preferably, are interposed between the flywheel and the hub of the helical gear 115, in the manner already described in connection with Fig. 6. The helical gear 114, meshing with the helical gear 115, is driven by the countershaft 257. The reservoir 265 through which the valve rod passes is closed off by the disc 266 from the cylindrical aperture in the valve housing 243' within which the valve element is disposed. Said reservoir is connected by the duct 267 to the reservoir 268, and the latter, by the pipe 133', is connected to the reservoir 134.

The impeller draws oil, or other suitable fluid, from the reservoir 265 to the reservoir 134 and thence drives it through the passageway 181, described in connection with Fig. 6, to the reservoir 269 into which the piston 110' projects. The hydraulic pressure developed by the impeller is thus communicated to said piston for the purpose hereinbefore set forth.

Figure 15:
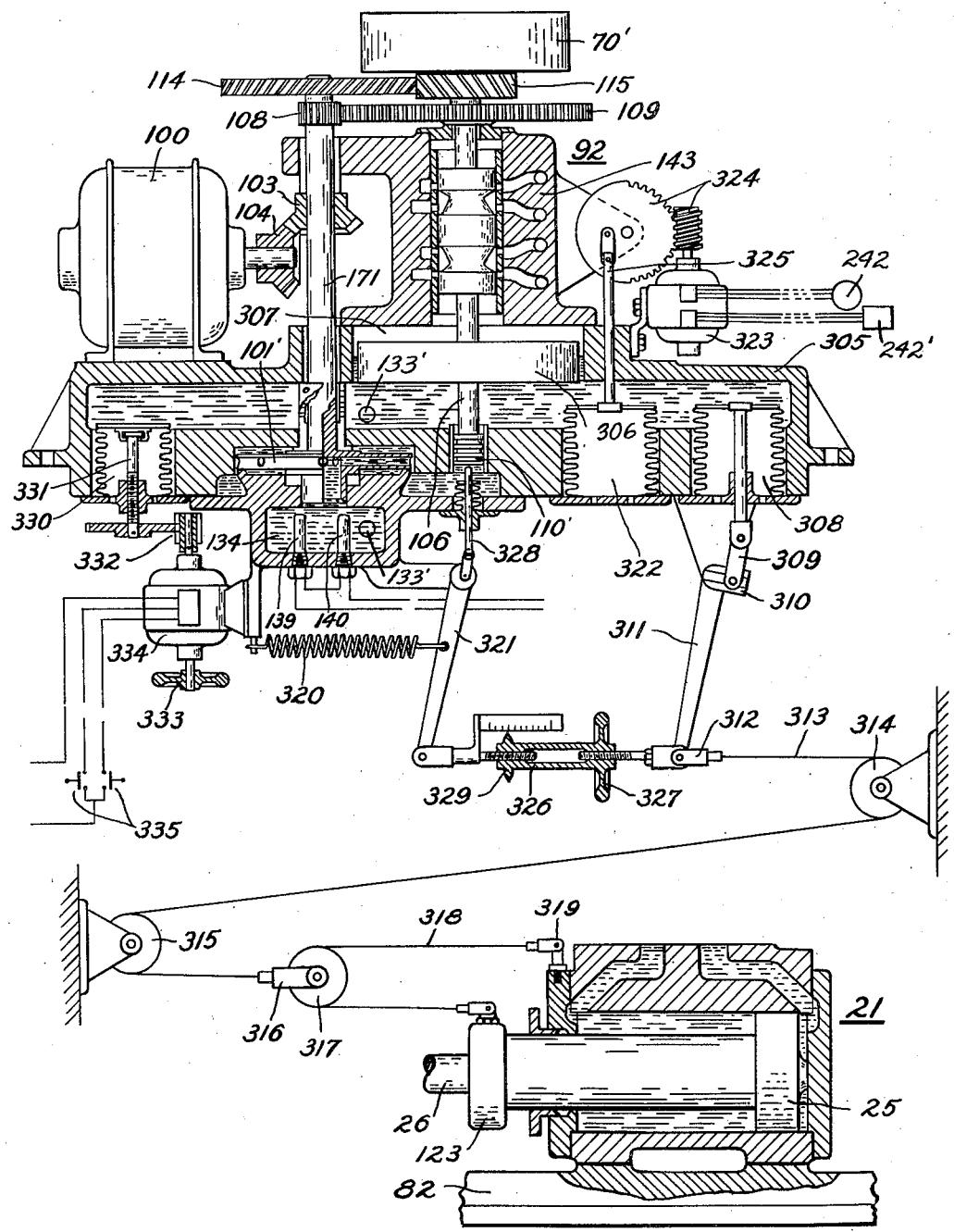
Fig. 15 is a fragmentary central vertical section, somewhat diagrammatic in nature, illustrating hydraulic biasing mechanisms that may be employed with my improved governor.

While the results effected by the two salient features of my invention, viz., the impeller employed to impart axial movement to the valve proportional to the speed of the prime mover in lieu of the centrifugally actuated weighted devices heretofore used for this purpose, and the impeller-inertia-element combination whereby the valve may be brought to its neutral position at substantially the same instant that the prime mover speed returns to normal, are not dependent upon the use of the balanced valve shown in the several embodiments of my invention, nevertheless, I prefer to employ such balanced valve of the three-way type, one form of which is illustrated in Figs. 9-13, inclusive, for the reason, among others, that such valve is particularly sensitive to the extremely slight biasing forces heretofore described in connection with Fig. 2, as well as the biasing forces imposed hydraulically upon the valve which will be hereinafter explained in connection with Fig. 15.

This balanced valve, which I believe to be broadly new with me, may be regarded as the third salient feature of my invention.

For convenience of description, the valve may be considered as comprising an upper and a lower half (Fig. 3a). It is to be understood, of source, that the description of the upper half applies also to the lower half. The inner surface of the valve sleeve 150, fixedly secured within the housing 143, is provided with a circumferential groove 275, which is shallow with respect to the width thereof, designated in Fig. 13 as $a$. The valve element snugly fitting within the valve sleeve, at all times co-operates with said groove to afford a narrow annular passageway 276, through which the oil or other fluid under pressure which actuates the servomotor will flow when the intake port 152 is connected to the outlet port 151 by way of the specially contoured annular groove 153 formed in the valve element. The grooved portion of the sleeve communicates at its outer edge 277 with a plurality of openings, viz., the outlet ports 151, herein shown as annular, although it will be understood that the shape of such ports is not material. Said passageway and said openings constitute reaction ports producing upon the valve a force that will open it more widely as soon as the intake port is brought into communication with the outlet port. The sleeve is also provided with a plurality of ports 278 termed herein "free" ports, which extend through the sleeve and are in spaced relation around the grooved portion thereof. The free ports are shown in the present instance as having two straight parallel sides 279, rising from the base 280 thereof, the plane of which is herein shown as normal to the axis of the valve.

The effect of the discharge of oil through the opening 278 when the intake port 152 is brought into communication with the outlet port 151, is to exert upon the valve element a force tending to close the valve (Bernoulli effect). I have discovered that by the proper proportioning of the reaction ports and the free ports, the two forces aforesaid may be made substantially equal, so that the valve can be moved, especially while rotating, with an almost negligible force.

The sleeve inwardly of the grooved portion thereof, is provided with a plurality of intake ports 152, one for each pair of said free and reaction ports. The valve element 105 is provided with an annular groove 153, which, as will be apparent, is disposed to connect the intake ports with the respective pairs of free and reaction ports upon the movement of said valve element outwardly from the position indicated in Fig. 9. The valve shown has, for convenience, outward flow through both sets of balanced ports, but similar results may be obtained with inward flow, if the reaction and free ports are made in the valve instead of in the sleeve.

While it will be apparent to those skilled in the art that a multiplicity of sizes and shapes of the various grooves and openings hereinbefore described may be employed to effect the desired result, I include herein for completeness of disclosure and without limiting myself thereto, one set of dimensions as follows, to wit:

The circumferential distance $b$ between the walls of the opening 278 is .250". The width $a$ of the annular groove is .214", and the depth of the groove 275 in the inner surface of the sleeve is .018".

The internal diameter of the valve sleeve is 1.638".

The annular groove 153, formed in the valve element, is shown in the present instance as formed by two intersecting conical surfaces, one of greater length along its generatrix than the other, said surfaces being disposed at unequal angles with the axis of the valve element. In the present instance, the angle $c$ of the upper surface with said axis is approximately 50°, and that of the other, indicated at $d$, approximately 30°.

While I have shown and described my improved balanced valve as having in both the upper and lower halves thereof a plurality of pairs of free and reaction ports, each pair constituting an outlet port 151 and a plurality of co-operating intake ports 152; it is to be understood that each half of the valve may have but one pair of free and reaction ports forming one outlet port and one intake port co-operating therewith.

Figure 14:
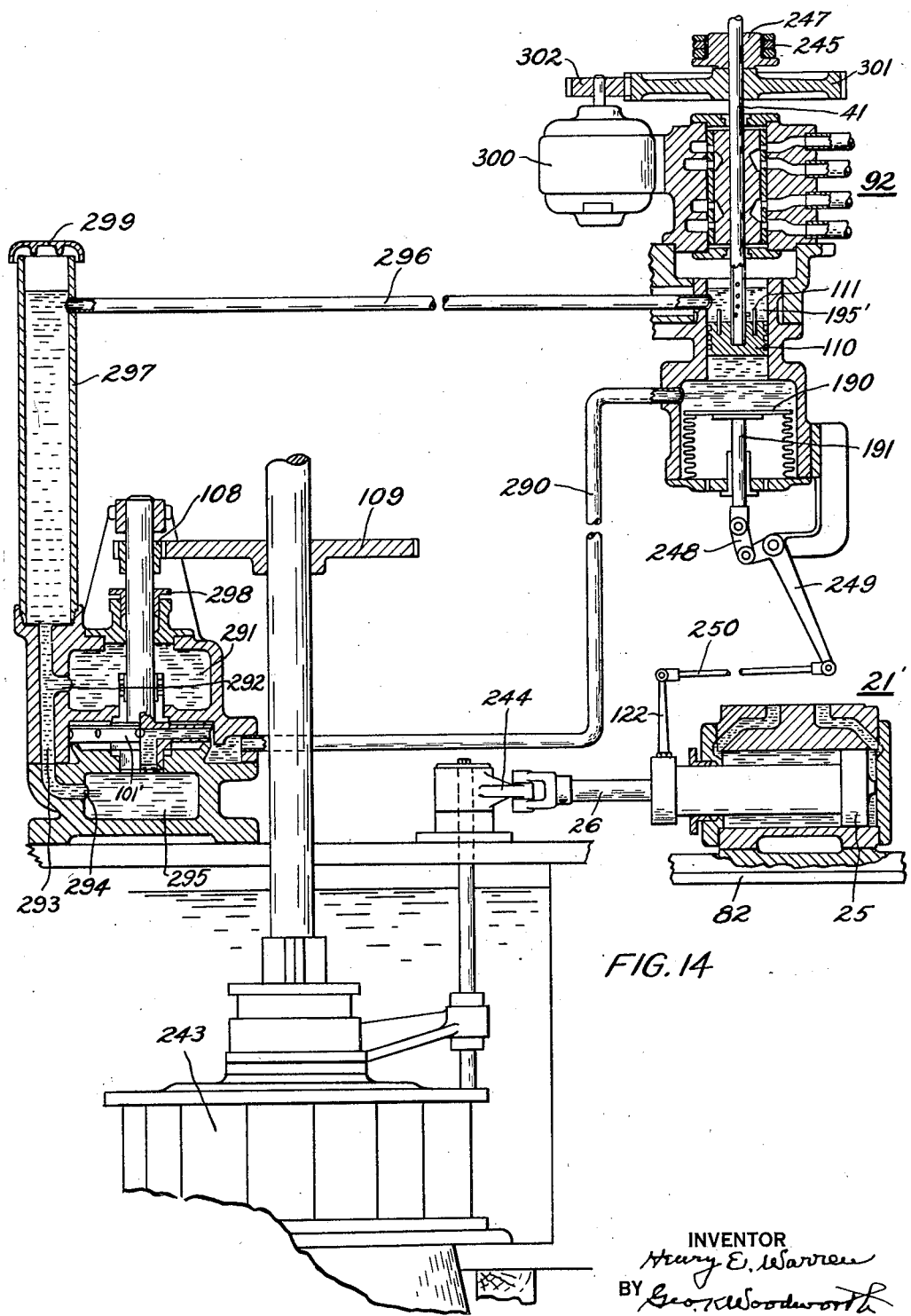
Fig. 14 is a fragmentary central vertical section, partly in elevation, and partly diagrammatic, illustrating a modification in which the speed measuring impeller is located closely to the turbine and the remainder of the governor is disposed at a distance therefrom.

It is sometimes desirable to locate the impeller closely adjacent to the turbine the speed of which is to be controlled, and the other parts of the governor at a more or less distant point, connecting these two elements by piping, or other suitable means, for conveying to the valve the hydraulic pressure developed by the impeller to impart axial movement to the valve. Such an arrangement is shown in Fig. 14, wherein the impeller 101' is driven directly by the turbine 243 through the spur gearing 109, 108, and the hydraulic pressure developed thereby conveyed to the piston 110 by the pipe 290. In such case, the reservoir 291 above the impeller casing is connected by the port 292, the passageway 293, and the port 294, to the reservoir 295 below the impeller. Any oil that may leak past the piston 110 into the chamber 195' in which said piston is disposed for rotary and axial movement is conveyed by the pipe 296 to the standpipe 297, so that the oil level is maintained constant both in said chamber 195' and the standpipe, and no oil is lost from the system.

The reservoir 291 is open to the atmosphere only at the top of the standpipe, as it is sealed at the pump shaft by the packing gland 298. The top of the standpipe may be provided with a protective cover 299, the flanges of which are spaced away from the walls of the standpipe. The valve and piston are driven at relatively low speed by a small auxiliary motor 300 through the spur gear 301 mounted on and secured to the valve rod 41 and meshing with the spur gear 302 carried by the motor shaft. As the sole object of rotating the valve and piston is to minimize friction, the motor 300 need not be capable of measuring the speed of the turbine or the frequency of the generator driven thereby. The servomotor 21' must, of course, be located near the gate mechanism, and the piston thereof is connected to the lever 249 and link 248 which actuate the Sylphon bellows 190, or the piston cylinder 50 or 133, if the structures shown in Figs. 5 and 2, respectively, are employed, by a long rod 250.

In Figure 15, I have shown hydraulic means for effecting the biasing described in connection with Figs. 2 and 4. In this figure, the impeller shaft 171 is driven by the motor 100, which is energized by the generator driven by the prime mover the speed of which is to be governed through the miter gears 103, 104, and the valve rod is driven through the spur gears 108, 109. The helical gears 114, 115, perform the function hereinbefore set out.

The motor and valve casing are mounted on the tank 305, containing a quantity of liquid, such as oil, upon which is placed a hollow float 306 secured to the valve stem 106 having a piston 110' attached to or integral with the lower end thereof. The area of the float perpendicular to the valve stem is sufficient to cause a variation of several per cent in the effective weight of the valve system by variations in the depth to which said float is submerged. A chamber 307 is formed in the central portion of the upper face of the tank, the diameter of said chamber slightly exceeding that of the float disposed therein. The height of the liquid in the tank is such that the plane of the lower face of the float is coincident with the plane of the lower edge of the chamber, or slightly above the same. The arrangement is such that relatively small movements of the several metallic bellows placed in the tank will cause a relatively large change in the level of the oil and, consequently, in the position of the float, such change, of course, resulting in a corresponding change in the axial position of the valve. At the same time, there is sufficient clearance between the float and chamber to render negligible errors due to surface tension.

Disposed on the base of the tank and extending into the oil therein is a metallic bellows 308, the rod of which is adjustably connected by the link 309 to the arm 310 of a bell crank lever, the other arm 311 of which is pivotally connected to the bifurcated coupling member 312, and the latter may be connected in any suitable manner for actuation by the servomotor piston. In the present instance, said coupling is secured to one end of the cord 313 passing around the pulleys 314, 315, the other end of said cord being connected to the fork 316 within which is pivoted the pulley 317, around which passes the cord 318, one end of which is fixed to the servomotor frame at 319 and the other to the collar 123 on the servomotor piston. As the result of these connections, the inward movement of the servomotor piston will cause the lever 311 to move about its pivot in a counterclockwise direction. On the outward movement of said piston, the spring 320, connected at one end to an arm depending from the bottom of the tank and at the other to the lever 321 connected to the coupling member 312, will cause the lever 311 to move about its pivot in a clockwise direction.

By the movement of the lever 311 in either direction, the metallic bellows is moved upwardly or downwardly, as the case may be, and the level of the oil in the tank varied, with the result that the axial position of the valve is changed. Thus, it will be seen that by the servomotor-actuated bellows 308, the same result is effected as by the spring biasing means 221 of Fig. 2. Disposed within the casing also is the metallic bellows 322 which effects the same result as the synchronous motor-actuated spring 222 of Fig. 2; namely, the imposition upon the valve of sufficient bias to maintain average frequency between the prime mover driven generator and a standard frequency.

While the bellows 322 may be actuated by the arm 223, the position of which is governed by the synchronous motors 229, 231 hereinbefore described, I prefer to employ the synchronous motor 323 having one of its elements, for example, the rotor, energized by the frequency of the generator 242 driven by the prime mover the speed of which is to be governed, and the other, in this instance, the stator, by a standard frequency 242'. In this case, if the system being regulated has the same average frequency as the frequency desired, the motor will remain stationary, and if there is an error in the system being regulated, the motor will rotate and the motion thereof communicated by the worm gearing 324 to the Sylphon rod 325. The level of the liquid in the tank will thus be varied and the position of the valve altered accordingly.

The means connecting the arm 321 with the coupling member 312 is herein shown as a turnbuckle 326, provided with a handwheel 327, whereby the position of the rod 328 may be adjusted manually to govern the lowermost position of the piston 110 and thereby control the maximum opening of the turbine gate, this arrangement replacing the hand wheel actuated cam 207 of Fig. 2.

The turnbuckle 326 is provided with a V-edge disc pointer 329 and a co-operating scale whereby the gate limit setting may be indicated.

The metallic bellows 330 may be employed to supplant the counterpoise 218 of Fig. 2, and also to effect remote speed control of the generator driven by the prime mover. The rod 331 of the bellows is in threaded engagement with the base of the tank and may be driven through the gearing 332, either manually by the hand wheel 333 or electrically by a small electric motor 334, having two fields one of which causes the motor to rotate clockwise and the other, counterclockwise. By means of the switches 335, the bellows rod may be moved upwardly or downwardly, which will of course have the same effect as varying the position of the counterpoise 218 in Fig. 2.

Having thus described illustrative embodiments of my invention without, however, limiting the same thereto, what I claim and desire to secure by Letters Patent is:

1. In a speed governor having a servomotor, a source of fluid under pressure and a valve mounted for axial and rotary movement, said valve being interposed between said source and said servomotor for controlling the supply of fluid thereto, the combination of a rotatable hydraulic piston provided with centrifugal impeller means, means directly connecting said piston to said valve, said valve being movable in one direction by a definite force, a cylinder disposed for axial movement and containing a liquid, said piston and centrifugal impeller means being disposed in said cylinder for co-operation with said liquid to create hydraulic pressure tending to move said piston and said valve axially in a direction opposite to that of the movement imparted thereto by said definite force and being freely mounted and supported, when in steady-state operation, solely by said liquid, and the force due to said liquid in steady-state operation being opposed by a constant force equal thereto, means connecting said piston for rotation by the prime mover the speed of which is to be governed, and means connecting said cylinder with said servomotor for effecting axial movement of said cylinder to vary the effect of said hydraulic pressure on said piston.

2. In a speed governor having a servomotor and an axially movable servomotor control valve, the combination of a casing axially movable with respect to said valve, centrifugal means disposed in said casing, a reservoir containing a liquid, means affording communication between said reservoir and said centrifugal means, said centrifugal means being disposed to co-operate with said liquid for creating a hydraulic pressure tending to move said valve axially, means transmitting to said valve the hydraulic pressure developed by said centrifugal means, means connecting said centrifugal means for rotation by the prime mover the speed of which is to be governed, and means connecting said servomotor to said casing for axial movement of the latter.

3. In a speed governor having a servomotor and an axially movable servomotor control valve, the combination of a casing axially movable with respect to said valve, said casing containing a liquid, centrifugal means disposed in said casing for co-operation with said liquid to create hydraulic force tending to move said valve axially, said valve being freely mounted and supported, when in steady-state operation, solely by said liquid, and the force due to said liquid, in steady-state operation, being opposed by a constant force equal thereto, means connecting said centrifugal means for rotation by the prime mover the speed of which is to be governed, and means transmitting to said valve the force developed by said centrifugal means.

4. In a speed governor having a servomotor and an axially movable servomotor control valve, the combination of an axially movable rotatable valve, a casing containing a liquid, centrifugal means disposed in said casing for co-operation with said liquid to create hydraulic pressure imparting to said valve axial movement proportional to the speed of said centrifugal means, said valve being freely mounted and supported, when in steady-state operation, solely by said liquid, and the force due to said liquid, in steady-state operation, being opposed by a constant force equal thereto, means connecting said centrifugal means for rotation by the prime mover the speed of which is to be governed, a rotatable axially movable inertia element including a flywheel secured thereto for axial movement therewith, said element co-operating with said valve for imparting thereto axial movement directly proportional to acceleration or retardation of the speed of said inertia element, and means connecting said inertia element for rotation by said prime mover.

5. In a speed governor having an axially movable servomotor control valve, the combination of a rotatable inertia element co-operating with said valve for imparting thereto axial movement upon acceleration or retardation of the speed of said inertia element, said inertia element comprising a two-gear helical gearing means, one gear driving the other through a rolling contact which continually shifts from tooth to tooth thus eliminating static friction, the driving gear being connected for rotation by the prime mover the speed of which is to be governed and the driven gear being axially movable and operatively associated with said valve, whereby the acceleration force acting on the valve will be directly proportional to such acceleration or retardation.

6. In a speed governor having an axially movable servomotor control valve supported by hydraulic pressure which is opposed during steady-state operation solely by a force independent of the position of said valve, the combination of a rotatable flywheel co-operating with said valve, a pair of helical gears, one of said helical gears being axially movable, and the other being axially fixed, the one gear driving the other through a rolling contact which continually shifts from tooth to tooth thus eliminating static friction, means connecting the axially fixed gear for rotation by the prime mover the speed of which is to be governed, and means connecting the axially movable gear to impart axial movement to said valve upon acceleration or retardation of the speed of said flywheel, whereby the acceleration force acting on the valve will be unopposed by friction and be directly proportional to such acceleration or retardation.

7. In a speed governor having an axially movable servomotor control valve, the combination of a speed measuring impeller co-operating with a liquid to develop hydraulic pressure, means communicating to said valve the hydraulic pressure developed by said impeller to impart axial movement thereto, a stabilizing means comprising a rotatable flywheel co-operating with said valve, a pair of helical gears, one of said helical gears being axially movable and the other axially fixed, the one gear driving the other through a rolling contact which continually shifts from tooth to tooth thus eliminating static friction, means connecting the driving helical gear and impeller for rotation by the prime mover the speed of which is to be governed, and means connecting said flywheel to said valve to vary the axial movement of the latter in direct proportion to the changes in the acceleration of said flywheel.

8. In a speed governor having a servomotor and an axially movable servomotor control valve, the combination of a casing, an impeller disposed in said casing and co-operating with a liquid therein to develop hydraulic pressure, means communicating to said valve the hydraulic pressure developed by said impeller to impart axial movement thereto, said valve being freely mounted and supported, when in steady-state operation, solely by said liquid, and the force due to said liquid, in steady-state operation, being opposed by a constant force equal thereto, means connecting said impeller for rotation by the prime mover the speed of which is to be governed, and means connecting said servomotor to said casing for axial movement of the latter to vary the effect of said hydraulic pressure on said valve.

9. In a speed governor having a servomotor and an axially movable servomotor control valve, the combination of a casing, centrifugal means disposed in said casing and co-operating with a liquid therein to develop hydraulic pressure, means communicating to said valve the hydraulic pressure developed by said centrifugal means to impart axial movement thereto, said valve being freely mounted and supported, when in steady-state operation, solely by said liquid, and the force due to said liquid, in steady-state operation, being opposed by a constant force equal thereto, an inertia element, means connecting said inertia element for rotation by the prime mover the speed of which is to be governed, means connecting said inertia element to impart axial movement to said valve and dash pot means actuated by said servomotor for varying the effect of said hydraulic pressure on said valve.

10. In a speed governor having a servomotor, an axially movable servomotor control valve, a casing, centrifugal means disposed in said casing and co-operating with a liquid therein to develop hydraulic pressure, and means communicating to said valve the hydraulic pressure developed by said centrifugal means to impart axial movement thereto, said valve being freely mounted and supported, when in steady-state operation, solely by said liquid, and the force due to said liquid, in steady-state operation, being opposed by a constant force equal thereto, the combination of a rotatable inertia element including a flywheel co-operating with said valve and imparting thereto axial movement upon acceleration or retardation of the speed of said inertia element, and means connecting said flywheel for rotation by the prime mover the speed of which is to be governed, said means including helical gear means and a slip coupling controlling the maximum force applied by said flywheel to the valve.

11. In a speed governor, an axially movable servomotor control valve, a rod carrying said valve, a casing containing a liquid, centrifugal means disposed in said casing for co-operation with said liquid to create hydraulic pressure tending to move said valve axially, said valve being freely mounted and supported, when in steady-state operation, solely by said liquid, and the force due to said liquid, in steady-state operation, being opposed by a constant force equal thereto, a sleeve mounted for rotation around said rod, antifriction bearing means interposed between said sleeve and rod, a rotatable axially movable inertia element mounted on said sleeve for imparting to said rod axial movement in direct proportion to the acceleration or retardation of the speed of said inertia element, and means connecting said inertia element for rotation by the prime mover the speed of which is to be governed.

12. In a speed governor, an axially movable servomotor control valve, said valve being freely mounted and supported, when in steady-state operation, solely by said liquid, and the force due to said liquid, in steady-state operation, being opposed by a constant force equal thereto, speed-responsive means associated with said valve for moving the same axially, a rod carrying said valve, acceleration-measuring inertia means for varying the axial movement of said valve in direct proportion to the acceleration of said inertia means, said inertia means comprising two helical gears, one gear driving the other through a rolling contact which continually shifts from tooth to tooth thus eliminating static friction, and means coupling said inertia means to said rod, the means last mentioned being tangentially frictionless and axially positive.

13. In a speed governor having a servomotor and an axially movable servomotor control valve, the combination of a casing axially movable with respect to said valve, centrifugal means disposed in said casing, a reservoir containing a liquid, means affording communication between said reservoir and said centrifugal means, said centrifugal means being disposed to co-operate with said liquid for creating a hydraulic pressure tending to move said valve axially, means transmitting to said valve the hydraulic pressure developed by said centrifugal means, said valve being freely mounted and supported, when in steady-state operation, solely by said liquid, and the force created by the co-operation of said centrifugal means and said liquid being opposed, in steady-state operation, by a constant force equal thereto, and means connecting said centrifugal means for rotation by the prime mover the speed of which is to be governed.

14. In a speed governor having an axially movable servomotor control valve, the combination of a cylinder, a piston disposed in said cylinder, means coupling said valve to said piston for axial movement therewith, said cylinder being axially and independently movable with respect to said piston, an impeller disposed for co-operation with a liquid to develop hydraulic pressure, means communicating to said piston the hydraulic pressure developed by said impeller to impart axial movement to said piston and the valve connected thereto, said piston and valve being freely mounted and supported, when in steady-state operation, solely by said liquid, and the force due to said liquid, in steady-state operation, being opposed by a constant force equal thereto, and means connecting said impeller for rotation by the prime mover the speed of which is to be governed.

15. In a speed governor having an axially movable servomotor control valve, the combination of a cylinder, a piston disposed in said cylinder, means coupling said valve to said piston for axial movement therewith, an impeller disposed for co-operation with a liquid to develop hydraulic pressure, means communicating to said piston the hydraulic pressure developed by said impeller to impart axial movement to said piston and the valve connected thereto, said piston and valve being freely mounted and supported, when in steady-state operation, solely by said liquid, and the force due to said liquid, in steady-state operation, being opposed by a constant force equal thereto, and means connecting said impeller for rotation by the prime mover the speed of which is to be governed.

HENRY E. WARREN.

REFERENCES CITED

The following references are of record in the file of this patent:

UNITED STATES PATENTS

| Number | Name | Date |
|---|---|---|
| Re. 3,759 | Huntoon | Dec. 14, 1869 |
| 131,161 | Gericke | Sept. 10, 1872 |
| 261,980 | Back | Aug. 1, 1882 |
| 663,599 | Chambers | Dec. 11, 1900 |
| 931,707 | Warren | Aug. 17, 1909 |
| 1,130,659 | Baldwin | Mar. 2, 1915 |
| 1,222,984 | Pharo | Apr. 17, 1917 |
| 1,507,356 | Horton | Sept. 2, 1924 |
| 1,509,695 | Volet | Sept. 23, 1924 |
| 1,530,740 | Smoot | Mar. 24, 1925 |
| 1,813,222 | Barrett | July 7, 1931 |
| 1,814,631 | Ray | July 14, 1931 |
| 2,247,989 | Cita | July 1, 1941 |
| 2,256,963 | Schmidt | Sept. 23, 1941 |
| 2,341,384 | Kalin | Feb. 8, 1944 |
| 2,358,894 | Volet | Sept. 26, 1944 |
| 2,384,340 | Reggio | Sept. 4, 1945 |

FOREIGN PATENTS

| Number | Country | Date |
|---|---|---|
| 445,302 | France | Aug. 30, 1912 |